US008208563B2

(12) United States Patent
Dane et al.

(10) Patent No.: US 8,208,563 B2
(45) Date of Patent: Jun. 26, 2012

(54) BOUNDARY ARTIFACT CORRECTION WITHIN VIDEO UNITS

(75) Inventors: Gokce Dane, San Diego, CA (US); Chia-yuan Teng, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 791 days.

(21) Appl. No.: 12/395,244

(22) Filed: Feb. 27, 2009

(65) Prior Publication Data

US 2009/0268823 A1    Oct. 29, 2009

Related U.S. Application Data

(60) Provisional application No. 61/047,381, filed on Apr. 23, 2008.

(51) Int. Cl.
*H04N 11/02* (2006.01)

(52) U.S. Cl. ......... 375/240.27; 375/240.01; 375/240.23; 375/240.26; 375/240.29

(58) Field of Classification Search . 375/240.01–240.29
See application file for complete search history.

(56) References Cited

U.S. PATENT DOCUMENTS

| | | | | |
|---|---|---|---|---|
| 5,721,822 | A * | 2/1998 | Agarwal | 710/68 |
| 6,480,632 | B2 | 11/2002 | Martins et al. | |
| 7,558,320 | B2 | 7/2009 | Winder et al. | |
| 7,564,902 | B2 * | 7/2009 | Sasai et al. | 375/240.26 |
| 2001/0024515 | A1 | 9/2001 | Martins et al. | |
| 2004/0208246 | A1 * | 10/2004 | Conklin | 375/240.16 |
| 2004/0252759 | A1 | 12/2004 | Winder et al. | |
| 2005/0254581 | A1 * | 11/2005 | Iguchi et al. | 375/240.12 |
| 2007/0237227 | A1 * | 10/2007 | Yang et al. | 375/240.12 |
| 2007/0268965 | A1 * | 11/2007 | Alfonso et al. | 375/240.01 |
| 2008/0025390 | A1 * | 1/2008 | Shi et al. | 375/240.02 |
| 2008/0226197 | A1 * | 9/2008 | Saga | 382/300 |

FOREIGN PATENT DOCUMENTS

EP    1422928 A2    5/2004

OTHER PUBLICATIONS

International Search Report & Written Opinion—PCT/US2009/041458, International Search Authority—European Patent Office—Sep. 23, 2009.
G. De Haa, P.W.A.C Biezen, H. Huijgen, and O.A. Ojo, "Graceful Degradation in Motion Compensated Field-Rate Conversion", Signal Processing of HDTV, V, L.Stenger, L. Chiariglione and M. Akgun (Eds.). Elsevier 1994, pp. 249-256.

* cited by examiner

*Primary Examiner* — Ayaz Sheikh
*Assistant Examiner* — Andrew C Lee
(74) *Attorney, Agent, or Firm* — Brent A. Boyd

(57) ABSTRACT

This disclosure describes techniques for correcting artifacts that occur along a boundary of a substitute video unit generated using video unit substitution, e.g., motion-compensated video unit interpolation or extrapolation. In accordance with the techniques described in this disclosure, a frame substitution unit identifies first locations within a substitute video unit that correspond with a boundary that exists within a reference video unit and should exist within the substitute video unit, and corrects boundary artifacts in the first locations using a first boundary artifact correction technique. The frame substitution unit also identifies second locations within the substitute video unit that correspond with a boundary that exists within the substitute video unit and does not exist within the reference video unit and corrects boundary artifacts in the second locations using a second boundary artifact correction technique.

48 Claims, 11 Drawing Sheets

BOUNDARY ARTIFACT CORRECTION WITHIN VIDEO UNITS

This application claims the benefit of U.S. Provisional Application No. 61/047,381, filed Apr. 23, 2008, the entire content of which is incorporated herein by reference.

TECHNICAL FIELD

The disclosure relates to digital video coding and, more particularly, techniques for improving artifacts within digital video data.

BACKGROUND

A number of video encoding techniques have been developed for encoding digital video sequences. The Moving Picture Experts Group (MPEG), for example, has developed several techniques including MPEG-1, MPEG-2 and MPEG-4. Other examples include the International Telecommunication Union (ITU)-T H.263 standard, and the ITU-T H.264 standard and its counterpart, ISO/IEC MPEG-4, Part 10, i.e., Advanced Video Coding (AVC). These video coding standards support efficient transmission of video sequences by encoding data in a compressed manner. Compression reduces the overall amount of data that needs to be transmitted.

Video compression may involve spatial and/or temporal prediction to reduce redundancy inherent in video sequences. Intra-coding uses spatial prediction to reduce spatial redundancy between video blocks within the same video frame. Inter-coding uses temporal prediction to reduce temporal redundancy between video blocks in successive video frames. For inter-coding, a video encoder performs motion estimation to generate motion vectors indicating displacement of video blocks relative to corresponding prediction video blocks in one or more reference frames. The video encoder performs motion compensation to generate a prediction video block from the reference frame, and forms a residual video block by subtracting the prediction video block from the original video block being coded.

To meet low bandwidth requirements, some video applications may encode video at a reduced frame rate and/or skip encoding of some frames. Unfortunately, low frame rate video can produce temporal artifacts in the form of motion jerkiness. Frame interpolation or extrapolation may be employed at the decoder side to approximate the content of frames that are skipped by the encoder, or frames that are beyond the basic frame rate produced by the encoder. Frame interpolation or extrapolation may generally be referred to as frame substitution. Frame substitution may be used, in effect, to upconvert an actual frame rate to provide a perception of smoother motion. Frame insertion or substitution may be used to support a process often referred to as frame rate up conversion (FRUC). FRUC can be used to convert different video frame formats, e.g. converting from one frame rate to another frame rate. Although FRUC may enhance temporal quality by substituting frames, e.g., using interpolation or extrapolation, substitution of some frames may introduce undesirable spatial artifacts that undermine visual quality.

SUMMARY

This disclosure describes techniques for correcting visual artifacts that occur along a boundary in a substitute frame. The boundary in the substitute frame may occur along a top, bottom and/or one or more sides of the video frame. Alternatively, or additionally, the boundary in the substitute frame may be located within the frame, such as in the case of a video frame that supports the picture in picture mode. In accordance with the techniques of this disclosure, a frame substitution unit may identify locations within the substitute frame that correspond to boundary artifacts and correct the boundary artifacts. In one aspect, the frame substitution unit may handle boundary artifacts within the substitute video frame differently based on a type of boundary artifact.

The frame substitution unit may identify at least two different types of boundary artifacts. In one example, the frame substitution unit may identify first locations within the substitute frame that correspond with a boundary that exists within a reference frame used to generate the substitute frame and should exist within the substitute frame. These first locations may be referred to as "actual boundary locations" because the locations correspond to a boundary that actually exists within the reference video frame. The actual boundary locations may correspond with boundary artifacts, such as when the boundary does not extend far enough into the substitute frame due to motion compensated prediction.

The frame substitution unit may also identify second locations within the substitute frame that correspond with a boundary that exists within the substitute video frame, but does not exist within the reference video frame used to generate the substitute frame. These second locations may be referred to as "false boundary locations" because the locations correspond to a boundary that does not actually exist within the reference video frame, but is propagated into the substitute frame, e.g., due to motion compensated interpolation. The false boundary locations may correspond with boundary artifacts, such as when motion compensated prediction extends the boundary further within the substitute frame than the reference frame.

The frame substitution unit may correct the boundary artifacts at the actual boundary locations using a first boundary artifact correction technique and correct the boundary artifacts at the false boundary locations using a second boundary artifact correction technique. The first and second boundary artifact correction techniques may occur within the pixel domain (e.g., after interpolating or extrapolating the pixel values of the substitute frame) or within the compressed domain (e.g., before interpolating or extrapolating the pixel values of the substitute frame).

In one aspect, a method includes identifying first locations within a substitute video unit that correspond with a boundary that exists within a reference video unit and identifying second locations within the substitute video unit that correspond with a boundary that exists within the substitute video unit and does not exist within the reference video unit. The method also includes correcting boundary artifacts in the first locations of the substitute video unit using a first boundary artifact correction technique and correcting boundary artifacts in the second locations of the substitute video unit using a second boundary artifact correction technique.

In another aspect, an apparatus comprises a boundary artifact identification unit that identifies first locations within a substitute video unit that correspond with a boundary that exists within a reference video unit and identifies second locations within the substitute video unit that correspond with a boundary that exists within the substitute video unit and does not exist within the reference video unit and a boundary artifact correction unit that corrects boundary artifacts in the first locations of the substitute video unit using a first boundary artifact correction technique and corrects boundary artifacts in the second locations of the substitute video unit using a second boundary artifact correction technique.

In another aspect, a device comprises means for identifying first locations within a substitute video unit that correspond with a boundary that exists within a reference video unit and identifying second locations within the substitute video unit that correspond with a boundary that exists within the substitute video unit and does not exist within the reference video unit and means for correcting boundary artifacts in the first locations of the substitute video unit using a first boundary artifact correction technique and correcting boundary artifacts in the second locations of the substitute video unit using a second boundary artifact correction technique.

The techniques described in this disclosure may be implemented in hardware, software, firmware, or a combination thereof. If implemented in software, the software may be executed by one or more processors. The software may be initially stored in a computer readable medium and loaded by a processor for execution. Accordingly, this disclosure contemplates computer-readable media comprising instructions to cause one or more processors to perform techniques as described in this disclosure.

For example, in some aspects, the disclosure provides a computer-readable medium comprising instructions to cause one or more processors to identify first locations within a substitute video unit that correspond with a boundary that exists within a reference video unit, identify second locations within the substitute video unit that correspond with a boundary that exists within the substitute video unit and does not exist within the reference video unit, correct boundary artifacts in the first locations of the substitute video unit using a first boundary artifact correction technique, and correct boundary artifacts in the second locations of the substitute video unit using a second boundary artifact correction technique.

The details of one or more aspects of the disclosed techniques are set forth in the accompanying drawings and the description below. Other features, objects, and advantages will be apparent from the description and drawings, and from the claims.

DETAILED DESCRIPTION

Figure 1:
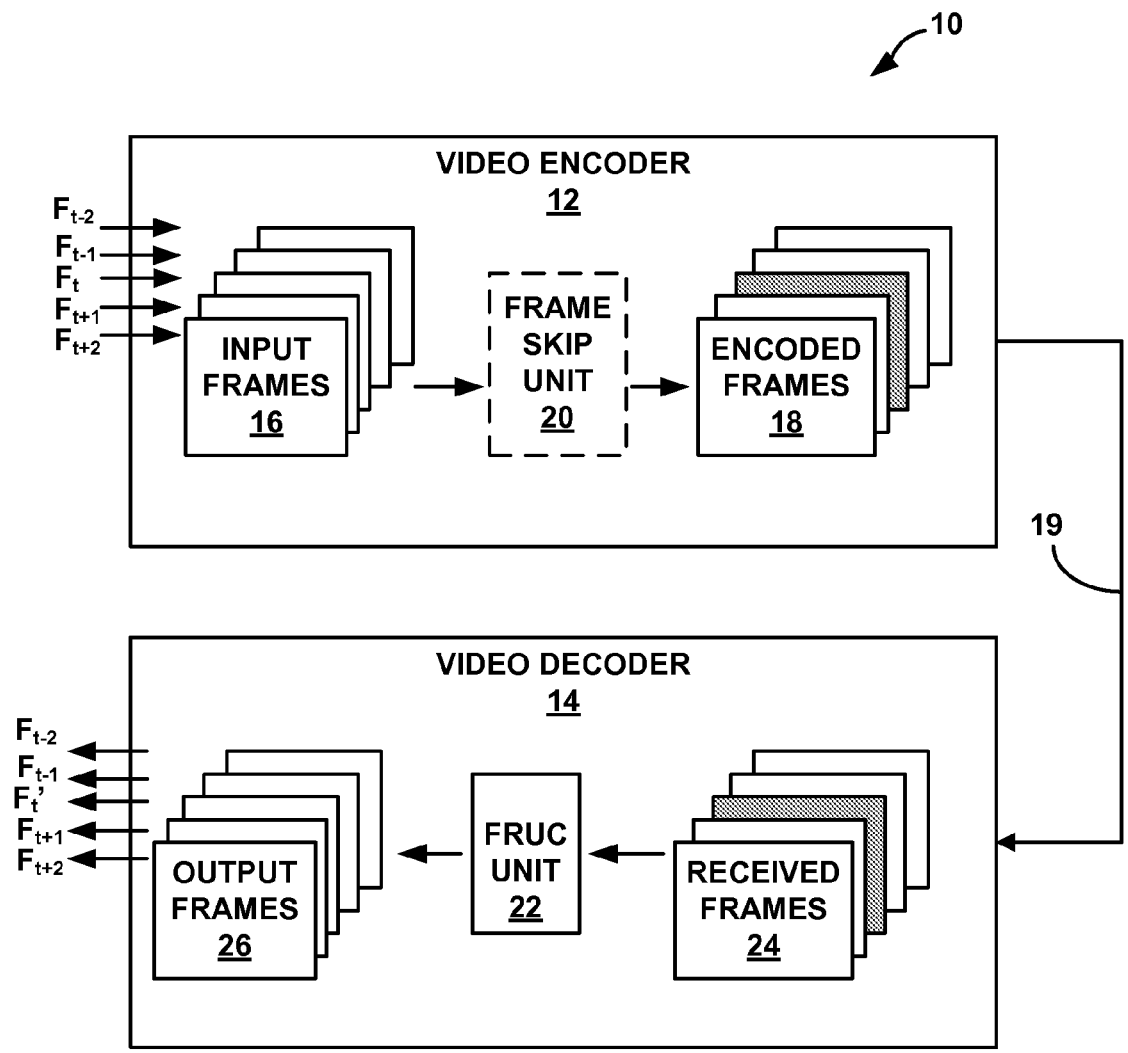
FIG. 1 is a block diagram illustrating an example video encoding and decoding system that corrects boundary artifacts generated during video unit substitution.

FIG. 1 is a block diagram illustrating an example video encoding and decoding system 10 that corrects boundary artifacts generated during video unit substitution in accordance with the techniques described in this disclosure. Video unit substitution, which may include video unit interpolation or extrapolation, generally refers to the approximation of the content of video units skipped by an encoder, video units beyond a basic video unit coding rate produced by the encoder or video units that are lost or corrupted during transmission over a communication channel. Video unit substitution may be used to support a process often referred to as frame rate up conversion (FRUC). Although the techniques of this disclosure may be applicable to a variety of types of video units, such as video frames, slices, blocks or sub-blocks, this disclosure generally describes application of the techniques to video frames for purposes of illustration.

As shown in FIG. 1, system 10 may include a video encoder 12 and a video decoder 14, each of which may be generally referred to as a video coder and which, in some examples, may be formed in a combined encoder-decoder (codec). In the example of FIG. 1, video encoder 12 receives input video frames 16 and encodes input video frames 16 to produce encoded video frames 18. Video encoder 12 may transmit encoded video frames 18 to video decoder 14 via a communication channel 19.

In particular, video encoder 12 may obtain a video stream that is made up of a sequence of input video frames 16. The video stream may be real-time or near real-time video, pre-recorded video, computer-generated video or a combination thereof. For example, video encoder 12 may obtain input video frames 16 of the video stream from a video camera, a video archive (e.g., memory) containing previously captured video, a video feed from a video content provider, and/or a video graphics processor that generates computer-generated video.

Video encoder 12 may compress the video data of the video stream using intra or inter prediction before entropy encoding the video data. Compressing the video data using intra or inter prediction may reduce the amount of data that must be transmitted between video encoder 12 and video decoder 14. Intra-prediction compresses the video data by reducing or removing spatial redundancy between video blocks within a given video frame by generating a prediction block using one or more neighboring blocks within the same video frame. Inter-coding compresses the video data reducing or removing temporal redundancy between video blocks of successive video frames of a video sequence. For inter-coding, video encoder 12 may perform motion estimation to track the movement of matching video blocks between two or more adjacent frames. Motion estimation generates motion vectors, which indicate the displacement of video blocks relative to corresponding prediction video blocks in one or more reference frames.

Motion compensation uses the motion vectors to locate and generate the prediction video blocks from a reference frame.

After intra or inter prediction of the prediction video block, video encoder 12 generates a block of residual information by subtracting the prediction video block from the original video block to be coded. Thus, the residual information quantifies the differences between the prediction video block and the video block being coded so that upon identifying the prediction video block and the residual information, the coded video block can be reconstructed at video decoder 14. Video decoder 14 may generate the prediction block in the same manner as described above with reference to video encoder 12. For example, video decoder 14 may receive header information that specifies whether to use inter or intra prediction, an intra prediction mode to use for intra prediction, a motion vector for use in inter prediction or the like.

To further reduce the amount of data that must be transmitted between video encoder 12 and video decoder 14, video encoder 12 may operate at a basic frame coding rate that is less than a source frame coding rate. In other words, the basic frame coding rate may be less than a desired frame coding rate. Alternatively, or additionally, in some cases, video encoder 12 may operate at a given frame coding rate, but optionally include or selectively activate a skip unit 20 that causes video encoder 12 to skip encoding of some frames. For example, video skip unit 20 may be configured to cause video encoder 12 to intentionally skip the encoding of some frames, thereby reducing the effective frame coding rate of video encoder 12, e.g., relative to a source frame coding rate. Frame skipping or reduced frame rate coding may permit encoder 12 to conform to a reduced transmission rate requirement of channel 19.

In the case of frame skipping, frames may be skipped by frame skip unit 20 at a fixed rate such that skipping occurs at alternating frames or at every $N^{th}$ frame. Alternatively, frames may be skipped at a varying rate, e.g., based on intelligent frame skipping criteria. Also, video encoder 12 may encode frames at a given frame coding rate on a fixed basis, or an adaptive basis such that frame coding rate is varied according to considerations such as channel conditions or other requirements. In either case, the frame coding rate may be effectively up-converted by the decoder 14 using frame substitution to produce a desired increased frame coding rate, e.g., from 30 fps to 60 fps or 120 fps.

Input video frames 16, labeled $F_{t-2}$, $F_{t-1}$, $F_t$, $F_{t+1}$, and $F_{t+2}$, represent a portion of the frames of the video sequence. Frame $F_t$ represents a frame that is not coded at time t, either due to frame skipping by optional frame skip unit 20 or due to the basic frame rate produced by video encoder 12. Frames $F_{t-2}$ and $F_{t-1}$ represent past frames that are located temporally prior to frame $F_t$, and frames $F_{t+1}$ and $F_{t+2}$ are future frames that are located temporally after frame $F_t$. The video sequence may include numerous frames both before and after frame $F_t$. For ease of illustration, however, only two frames before and two frames after $F_t$ are shown in FIG. 1.

Video encoder 12 encodes frames $F_{t-2}$, $F_{t-1}$, $F_{t+1}$ and $F_{t+2}$ to generate encoded frames 18. In the example illustrated in FIG. 1, the frame that is not coded at time t, e.g., frame $F_t$, is illustrated as the shaded frame in encoded frames 18, while the frames that are actually encoded by video encoder 12, e.g., frames $F_{t-2}$, $F_{t-1}$, $F_{t+1}$ and $F_{t+2}$ are illustrated as the non-shaded frames. In other words, although illustrated among encoded frames 18, frame $F_t$ is not actually an encoded frame.

Video encoder 12 transmits encoded frames 18 to video decoder 14 via transmission channel 19. Again, encoded frames 18 transmitted by video encoder 12 include $F_{t-2}$, $F_{t-1}$, $F_{t+1}$, $F_{t+2}$, but not frame $F_t$, as frame $F_t$ is not coded by video encoder 12 on account of being skipped by optional skip unit 20 or due to the basic frame rate utilized by video encoder 12. Transmission channel 19 may be a wired or wireless medium, or a combination of both, capable of conveying video frames within a bit stream. Channel 19 may support bi-directional or uni-directional video transmission. In bi-directional video transmission, for example, video encoder 12 transmits encoded video to video decoder 14 and receives encoded video from video decoder 14. In uni-directional video transmission, video encoder 12 may only transmit encoded video data to video decoder 14 and not receive encoded video data from video encoder 14.

Video decoder 14 receives frames 24 over transmission channel 19. Received frames 24 may be substantially identical to encoded frames 18 transmitted by video encoder 12, subject to frame, slice or block losses due to characteristics of transmission channel 19. For example, received frames 24 may be the same set of encoded frames 18 transmitted by video encoder 12 when no channel loss occurs. Received frames 24 may, in some instances, be slightly different than the set of encoded frames 18 transmitted by video encoder 12, e.g., due to the encoded bit stream being subject to losses from characteristics of transmission channel 19. In other words, one or more of the frames (or portions of the frames) actually coded and transmitted by video encoder 12 (e.g., frames $F_{t-2}$, $F_{t-1}$, $F_{t+1}$ and $F_{t+2}$) may be lost during transmission over transmission channel 19. For purposes of illustration, it will be assumed that received frames 24 are the same as encoded frames 18, i.e., no frames were lost during transmission. However, it should be understood that the techniques of this disclosure may be useful in performing frame substitution for frames lost during transmission in addition to or instead of frames not encoded due to intentional frame skipping or due to the basic frame rate.

Video decoder 14 may apply standard decoding techniques to decode each of received frames 24 ($F_{t-2}$, $F_{t-1}$, $F_{t+1}$, $F_{t+2}$), e.g., according to one of the MPEG-1, MPEG-2, MPEG-4, H.263, H.264, or MPEG-4, Part 10 standards. As described above, video decoder 14 may perform entropy decoding to decode the frames into a compressed format or domain, e.g., into frames still compressed using intra or inter prediction. Video decoder 14 may perform intra or inter prediction to decompress the frames into the pixel domain, e.g., frames that comprise pixel values associated with each pixel position.

Decoder 14 further includes FRUC unit 22, which may generate at least one additional frame, such as frame $F_t'$ of FIG. 1 using motion compensated frame substitution (e.g., motion compensated frame interpolation or extrapolation). Although described in this disclosure in the context of motion compensated frame substitution, the techniques may be utilized with other types of frame substitution with or without motion compensation, e.g., frame averaging. Thus, the techniques of this disclosure should not be limited to the correction of boundary artifacts during motion compensated frame substitution. Description of the techniques in the context of motion compensated frame substitution is only for purposes of illustration. The decoded video frames and substituted video frame are represented in FIG. 1 as output video frames 26. Video decoder 14 may output video frames 26 to drive a display device (not shown in FIG. 1).

Frame $F_t'$ is an approximation of frame $F_t$ that was not encoded by video encoder 12 or lost during transmission over channel 19. In this manner, video decoder 14 may convert the actual frame rate (or frame coding rate) to an increased frame rate. Such a process is sometimes referred to as frame rate up conversion (FRUC). In effect, decoder 14 may generate additional video units to increase the actual frame rate produced by video encoder 12 to an up-converted frame rate. As an example, if the actual frame rate produced by video encoder 12, with or without frame skipping, is 30 fps, then decoder 14 may be configured to substitute additional frames, e.g., by interpolation or extrapolation, to increase the effective frame rate from 30 fps to 60 fps or 120 fps. In effect, the additional frames are substituted for frames that have been skipped or frames that could have been included if the basic frame coding rate of video encoder 12 was greater. As described above, the frame rate produced by video encoder 12 may be less than desired due to a basic frame rate that is less than a source video rate (as a result of reduced bandwidth requirements of channel 19) and/or the optional skipping of some frames, e.g., by optional skip unit 20.

When the substitute frame $F_t'$ is generated via interpolation, video decoder 14 may generate frame $F_t'$ using is at least one previous frame and at least one future frame that can be used as reference frames. When the additional frame $F_t'$ is generated via extrapolation, instead of interpolation, video decoder 14 generates frame $F_t'$ using either one or more reference frames that reside temporally after frame $F_t'$ or one or more reference frames that reside temporally before frame $F_t'$. In either case, frame substitution employed by decoder 14 approximates the content of skipped or other excluded frames.

Frame substitution may, in some instances, produce visual artifacts in the decoded video stream. For example, if the frames of the video sequence include a boundary along a top, bottom and/or at least one side of the video frame, frame substitution may introduce shaking, flickering and/or blockiness at the boundary. Frames of the video sequence may include a solid color, e.g. black, boundary that extends around at least a portion of the perimeter of the frame. Such a boundary may be produced during format conversion of the video stream, e.g., from a MPEG-1 video stream to an H.264 video stream. For example, during boundary conversion an image size may be changed. If the image size is made smaller, some black or other color pixels may be added to the frame to adjust the size of the frame to fit a certain image size. The black or other color pixels may be added as a single strip on one side of the frame or symmetrically on all sides of the frame, thus creating a "boundary" within the frame.

In the case of motion compensated frame substitution, the interpolation or extrapolation using motion vectors may produce the visual artifacts in the substitute frame. If a boundary exists in the one or more reference frames, for example, the boundary in the substitute frame is generated using motion vectors generated as a function of motion vectors in the one or more reference frames. In some instances, the interpolated or extrapolated motion vectors may have different magnitudes and/or directions for each of the blocks of pixels (blocks) that include the boundary. Because no residual data is transmitted for the substitute frame, the boundary within the substitute frame may not the same as the boundary within the one or more reference frames. Instead, the boundary in the substitute frame may have a thicker width than the boundary in the one or more reference frames, a thinner width than the boundary in the one or more reference frames, or vary in thicknesses along the boundary. For example, the different motion vectors of each of the blocks may cause the boundary in the substitute frame to extend further within the substitute framed at some locations, e.g., within some blocks of the substitute frame, and not extend far enough into the substitute frame at other location, e.g., other blocks of the substitute frame. As a result, the boundary appears as if it is shaking during video playback, which may result in a less than desirable viewing experience. Although motion-compensated interpolation may produce the boundary artifacts, other interpolation/extrapolation techniques may also introduce the boundary artifacts. For example, in the case of temporal frame averaging, if a reference frame has a boundary of width of ten pixels and the current frame has a width boundary that has width of 12 pixels, then the interpolated frame might have some problem. This is not produced by motion compensation, but temporal averaging.

This disclosure describes techniques for correcting the artifacts that occur at the boundary of the substitute frame, whether the boundary is located along an edge of the frame or within the frame. In accordance with the techniques of this disclosure, video decoder 14 may identify locations within the substitute frame that correspond to boundary artifacts and correct the boundary artifacts. In one aspect, video decoder 14 may handle boundary artifacts within the substitute video frame differently based on a type of boundary artifact.

To do so, FRUC unit 22 may identify at least two different types of boundary artifacts. In one example, FRUC unit 22 may identify first locations within the substitute frame that correspond with a boundary that exists within a reference frame used to generate the substitute frame. These first locations may be referred to as "actual boundary locations" because the locations correspond to a boundary that actually exists within the reference video frame. The actual boundary locations may correspond with boundary artifacts, such as when the boundary does not extend far enough into the substitute frame due to motion compensated prediction. In other words, the boundary artifacts in the actual boundary locations correspond to a boundary that exists in the reference frame, but does not exist in the substitute frame.

FRUC unit 22 may also identify second locations within the substitute frame that correspond with a boundary that exists within the substitute video frame, but does not exist within the reference video frame used to generate the substitute frame. These second locations may be referred to as "false boundary locations" because the locations correspond to a boundary that does not exist within the reference video frame, but is propagated into the substitute frame, e.g., due to motion compensated interpolation. The false boundary locations may correspond with boundary artifacts, such as when motion compensated prediction extends the boundary further within the substitute frame than the reference frame. In other words, the boundary artifacts in the false boundary locations correspond to a boundary that does not exist in the reference frame, but does exist in the substitute frame.

FRUC unit 22 may correct the boundary artifacts at the actual boundary locations using a first boundary artifact correction technique and correct the boundary artifacts at the false boundary locations using a second boundary artifact correction technique. Because the actual boundary locations correspond to locations at which a boundary is supposed to exist (as the boundary exists in the one or more reference video frames), FRUC unit 22 may replace the actual boundary locations of the substitute frame with corresponding locations within at least one of the reference frames. For example, FRUC unit 22 may set the pixel values of pixels within the actual boundary locations equal to the pixel values of pixels at a corresponding location within one of the reference frames. In this manner, FRUC unit 22 performs boundary artifact correction in the pixel domain, e.g., after interpolating or extrapolating the pixel values of the substitute frame. As another example, FRUC unit 22 may set motion vectors associated with the blocks of the substitute frame located within the actual boundary location equal to zero and correct the boundary artifacts during decompression using motion compensation, e.g., by copying blocks at the corresponding locations within the reference frame. As such, the first boundary artifact correction technique may alternatively occur in the compressed domain, e.g., prior to interpolating or extrapolating the pixel values of the substitute frame.

FRUC unit 22 may correct the false boundary locations using a second boundary artifact correction technique. The second boundary artifact correction technique may be performed in either the pixel domain or in the compressed domain. In the pixel domain, FRUC unit 22 may determine a replacement pixel value for each of the pixels within the false boundary location using one or more pixels within the one or more reference frames or from the already interpolated pixels within the interpolated frame. For example, FRUC unit 22 may compute the replacement pixel value for each of the pixels within the false boundary location of the substitute frame by averaging pixel values of two pixels of one of the reference frames that are located in the same row as the pixel being replaced in the substitute frame and immediately adjacent to the boundary in the reference frame. In the compressed domain (e.g., before interpolating or extrapolating the pixel values of the substitute frame), FRUC unit 22 may correct the boundary artifacts within the false boundary location of the substitute frame by selectively choosing an intra prediction mode and interpolating the substitute frame using the selected intra prediction mode.

Although the techniques of this disclosure will be described in the context of a boundary that occurs along a top, bottom and/or sides of the video frame, the techniques of this disclosure may be used to correct boundary artifacts for boundaries located within the video frame. Two or more video sequences may be combined, e.g., using various video editing techniques such that a boundary may exist within the video frame instead of along an outer perimeter of the video frame. In the case of picture-in-picture, for example the boundary may be a square boundary located within the frame, e.g., in an upper right hand corner of the frame.

In the example of FIG. 1, FRUC unit 22 is shown within video decoder 14. In other implementations, FRUC unit 22 may form part of a video post-processing module (not shown in FIG. 1). A video post-processing module may process the output of video decoder 14, and may perform a variety of processing operations such as smoothing, sharpening, brightness control, and/or contrast enhancement, as well as the FRUC operations described above with respect to FRUC unit 22. As another alternative, FRUC unit 22 may form part of a video display processor or mobile display processor (MDP) device, e.g., for a mobile multimedia device. Accordingly, implementation of FRUC unit 22 within video decoder 14 is depicted in FIG. 1 and other figures for purposes of illustration, and should not be considered limiting of the techniques broadly described in this disclosure.

System 10 may be configured for video telephony, video streaming, video broadcasting, or the like. Accordingly, reciprocal encoding, decoding, multiplexing (MUX) and demultiplexing (DEMUX) components may be provided on opposite ends of channel 19. In some implementations, video encoder 12 and video decoder 14 may be provided within video communication devices such as wireless mobile terminals equipped for video streaming, video broadcast reception, and/or video telephony, such as so-called wireless video phones or camera phones.

Such wireless communication devices include various components to support wireless communication, audio coding, video coding, and user interface features. For example, a wireless communication device may include one or more processors, audio/video encoders/decoders (CODECs), memory, one or more modems, transmit-receive (TX/RX) circuitry such as amplifiers, frequency converters, filters, and the like. In addition, a wireless communication device may include image and audio capture devices, image and audio output devices, associated drivers, user input media, and the like.

Video encoder 12, video decoder 14 or both may be incorporated in a wireless or wired communication device as described above. Also, video encoder 12, video decoder 14 or both may be implemented as an integrated circuit device, such as an integrated circuit chip or chipset, which may be incorporated in a wireless or wired communication device, or in another type of device supporting digital video applications, such as a digital media player, a personal digital assistant (PDA), a digital television, or the like.

System 10 may support video telephony according to the Session Initiated Protocol (SIP), ITU-T H.323 standard, ITU-T H.324 standard, or other standards. Video encoder 12 may generate encoded video data according to a video compression standard, such as MPEG-2, MPEG-4, ITU-T H.263, ITU-T H.264, or MPEG-4, Part 10. Although not shown in FIG. 1, video encoder 12 and video decoder 14 may be integrated with an audio encoder and decoder, respectively, and include appropriate hardware and software components to handle both audio and video portions of a data stream.

Again, although the techniques of this disclosure are described with reference to video frames, the techniques may be applicable to a variety of other types of video units, such as slices, blocks or sub-blocks. However, this disclosure will generally describe application of the techniques to video frames for purposes of illustration, but without limitation of the aspects of such techniques as broadly described in this disclosure.

Figure 2A:
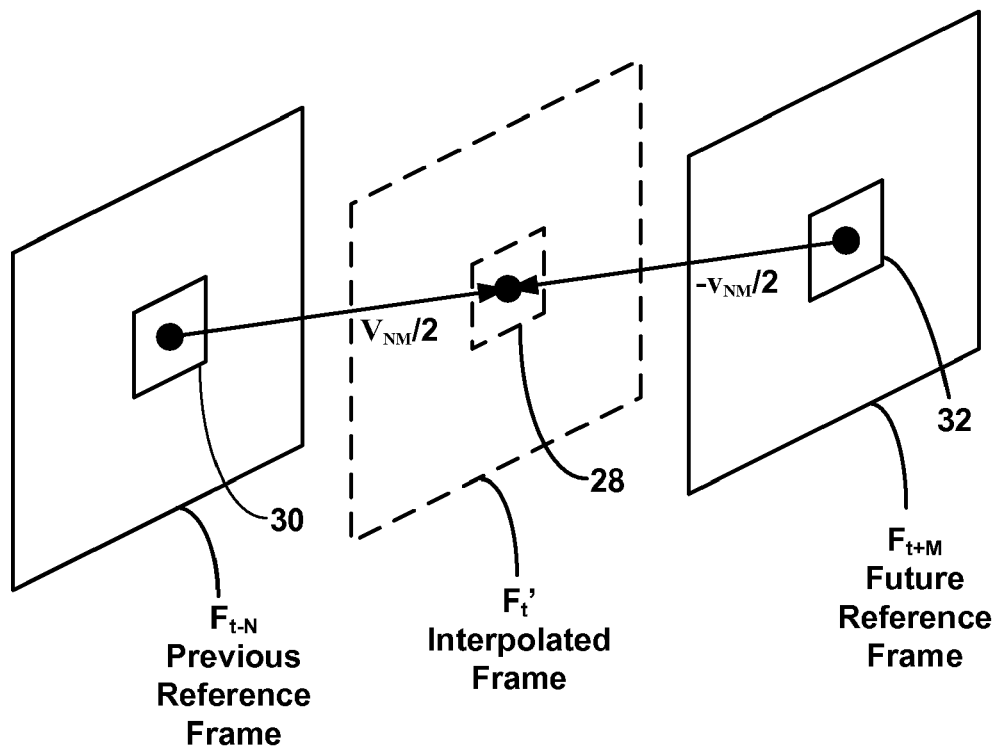
FIG. 2A is a diagram illustrating an example of a technique for interpolation of a video unit in a video decoder.

FIG. 2A is a diagram illustrating an example of a technique for interpolation of an additional frame in video decoder 14. Each of the frames may include a plurality of blocks of pixels, sometimes referred to as macroblocks. In general, to interpolate a macroblock (MB) 28 in an interpolated frame $F_t'$ between a selected previous frame $F_{t-N}$ and a selected future frame $F_{t+M}$, video decoder 14 may rely on a motion vector $v_{NM}$ extending between a MB 30 in previous frame $F_{t-N}$ and a corresponding MB 32 in future frame $F_{t+M}$. In this example, time t indicates the temporal location, i.e., time, at which the additional frame to be interpolated would appear in the video sequence. Frames $F_{t-N}$ and $F_{t+M}$ are frames that temporally precede (t−N) and follow (t+M), respectively, the additional frame $F_t'$ that requires interpolation. In the example of FIG. 2A, frames $F_{t-N}$ and $F_{t+M}$ serve as reference frames for interpolation of the additional frame $F_t'$.

N and M indicate temporal offsets, relative to time t, and may be equal or nonequal to one another. For example, if N=1 and M=2, frame $F_{t-N}$ may be the frame immediately preceding the interpolated frame, and frame $F_{t+M}$ may be the second frame after the interpolated frame. In a simple example in which N=1 and M=1, for interpolation, the vector $v_{NM}$ extending between frame $F_{t-N}$ and frame $F_{t+M}$ may be divided by two (for 1:2 frame rate conversion) to produce motion vectors $v_{NM}/2$ and $-v_{MN}/2$ and identify a corresponding MB 28 in the frame $F_t'$ to be interpolated. Hence, in this simplified example, the position of MB 28 is a function of the motion vectors $v_{NM}/2$ and $-v_{NM}/2$, where N=1 and M=1 for purposes of this example. The motion vector from $F_{t+m}$ to $F_t$ does not necessarily be $-v_{NM}/2$, it can be a processed version of $v_{NM}$, i.e., $-v_{NM}'/2$. MB 28 may be assigned a set of pixel values that correspond to MB 30 or MB 32, or an average of the pixel values of MB 30 and 32, or a linearly or non-linearly filtered version of pixel values of MB 30 and 32. For higher or lower frame upconversion, e.g., 1:X conversion, the motion vectors would be scaled accordingly. For other cases, e.g., in which at least one of N and M is not equal to one, different motion vectors obtained through motion estimation and motion vector processing may be used.

In addition, for some types of interpolation, FRUC unit 22 may rely on multiple reference frames, such as two or more previous frames and two or more future frames. In general, a reference frame refers to a frame that is used, either alone or in combination with one or more other reference frames, to interpolate a frame, such as a skipped frame. In the interpolation process, pixel values associated with macroblocks present in one or more reference frames may be used to interpolate pixel values in corresponding macroblocks in the additional frame to be interpolated, e.g., as shown in FIG. 2A. The pixel values may include luminance and/or chrominance pixel values.

As one example, an interpolated macroblock may include pixel values equal to pixel values in a macroblock in a previous frame, pixel values in a macroblock in a future frame, or an average of the pixel values in the corresponding macroblocks in the previous and future frames. The macroblocks in the interpolated frame may be motion compensated relative to corresponding blocks in the reference video frames, as shown in FIG. 2A. The macroblocks may be identified by motion vectors extending between the previous and future frames, as shown in FIG. 2A. The illustration of interpolation shown in FIG. 2A is one example, and should not be considered limiting of the techniques broadly described in this disclosure. A wide variety of different interpolation techniques may be used for frame substitution in accordance with this disclosure.

Figure 2B:
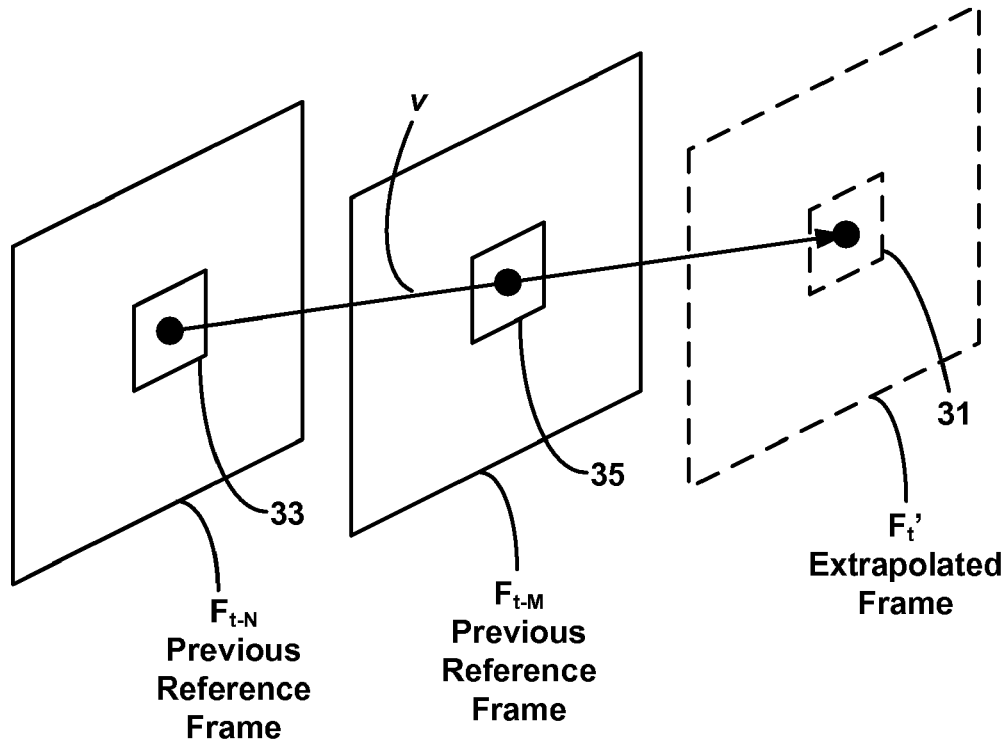
FIG. 2B is a diagram illustrating an example of a technique for extrapolation of a video unit in a video decoder.

FIG. 2B is a diagram illustrating an example of a technique for extrapolation of an additional frame in video decoder 14. In the example of FIG. 2B, two previous reference frames $F_{t-M}$ and $F_{t-N}$ are used to extrapolate an additional frame $F_t'$ to support frame substitution. In general, to extrapolate a MB 31 in a frame $F_t'$ following a selected previous frame $F_{t-N}$ and a selected previous frame $F_{t-M}$, video decoder 14 may rely on a vector v extending between a corresponding MB 33 in previous frame $F_{t-N}$ and a corresponding MB 35 in previous frame $F_{t-M}$. In this example, t indicates the temporal location, i.e., time, at which the additional frame to be extrapolated would appear in the video sequence. Frames $F_{t-N}$ and $F_{t-M}$ are frames that temporally precede by (t−N) and (t−M), respectively, the additional frame $F_t'$ that requires extrapolation. In the example of FIG. 2B, previous reference frames $F_{t-N}$ and $F_{t-M}$ serve as reference frames for extrapolation of the additional frame $F_t'$. However, more than two previous reference frames or one or more future reference frames may be used to extrapolate the additional frame $F_t'$. In other words, the additional frame may be extrapolated forward or backward using previous frames or future frames, respectively.

As in the example of FIG. 2A, N and M in FIG. 2B indicate temporal offsets, relative to time t, and may be equal or nonequal to one another. For example, if N=2 and M=1, frame $F_{t-M}$ may be the frame immediately preceding the extrapolated frame, and frame $F_{t-N}$ may be two frames before the extrapolated frame. MB 31 may be assigned a set of pixel values that correspond to MB 33 or MB 35, or an average of the pixel values of MB 33 and 35. As in the case of interpolation, for extrapolation, a reference frame may refer to a frame that is used, either alone or in combination with one or more other reference frames, to extrapolate an extra frame to be added to the decoded video frames.

The extrapolation may be motion compensated by extrapolating motion vector v from corresponding blocks in the reference frames, as shown in FIG. 2B. In the extrapolation process, pixel values associated with MBs present in one or more reference frames may be used to extrapolate pixel values in corresponding MBs in the additional frame to be extrapolated. The illustration of extrapolation shown in FIG. 2B is one example, and should not be considered limiting of the techniques broadly described in this disclosure. A wide variety of different extrapolation techniques may be used for frame substitution in accordance with this disclosure.

Figure 3A:
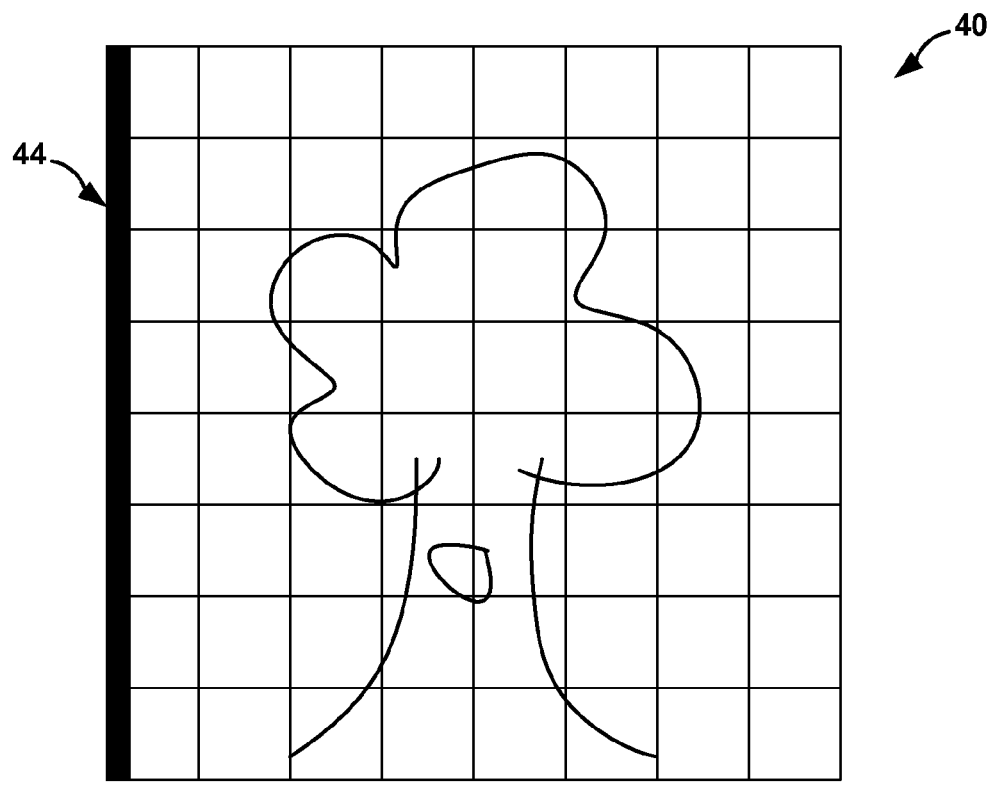
FIG. 3A is a diagram illustrating a reference video frame that includes a boundary.
Figure 3B:
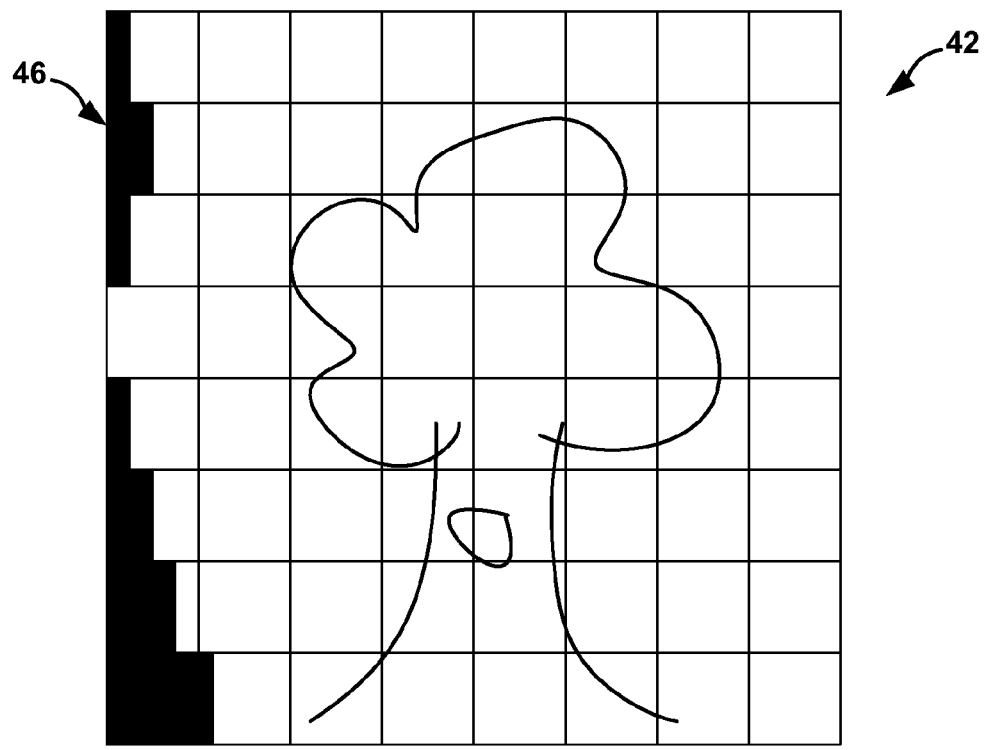
FIG. 3B is a diagram illustrating a substitute video frame that includes a boundary with boundary artifacts.

FIGS. 3A and 3B are diagrams illustrating example video frames that include a boundary. In particular, FIG. 3A illustrates an example reference video frame 40 that includes a boundary 44 along a left side of reference frame 40 and FIG. 3B illustrates an example substitute frame 42 generated using motion compensated frame substitution, e.g., motion compensated interpolation or extrapolation, using reference frame 40.

Video frames 40, 42 may be partitioned into a plurality of blocks of pixels, sometimes referred to as macroblocks or blocks. In the examples illustrated in FIGS. 3A and 3B, video frames 40, 42 are partitioned into eight rows and eight columns of blocks of pixels. As such, each of video frames 40, 42 includes sixty-four blocks of pixels. Video frames 40, 42 may include more or fewer blocks of pixels. The blocks of pixels typically represent a contiguous portion of the pixels within the video frame. For example, the blocks may represent an 8 pixel by 8 pixel (8×8) region of the frame. The blocks may, however, correspond to regions of other dimensions, such as 4×4, 4×8, 8×4, 8×16, 16×8, 16×16 or other dimensions. Although in the example frames 40, 42 illustrated in FIGS. 3A and 3B all of the blocks are of the same size, e.g., 8×8 blocks, the blocks of the frames 40, 42 may have varying block sizes.

Reference video frame 40 of FIG. 3A includes boundary 44 that extends along at least a portion of a left side of frame 40. In the example illustrated in FIG. 3A boundary 44 extends along the whole left side of frame 40, i.e., from top to bottom. However, in other examples, boundary 44 may only extend only along a portion, e.g., upper or lower half, of the left side of frame 40. Boundaries may also be provided along at least a portion of the top, bottom and right sides of frame 40 but are not shown in FIG. 3A for ease of illustration. Boundary 44 may be a solid color boundary, such as a black boundary. In other words, the pixels that are within boundary 44 may all have substantially the same pixel values to produce the solid color boundary. Boundary 44 has a length and a width. In the example illustrated in FIG. 3A, boundary 44 has a length equal to the entire side of the frame and a width equal to approximately one-quarter of a block width of the blocks of the first column. For blocks having 8×8 dimensions, for example, the length of boundary 44 is equal to sixty-four pixels and the width of boundary 44 is equal to two pixels. The width of boundary 44 of reference frame 40 is substantially the same along the entire length of the boundary. Boundary 44 may, however, have any length or width.

Motion compensated frame substitution uses motion compensation, e.g., motion vectors, to generate substitute frame 42. To generate substitute frame 42, for example, motion vectors may be generated for the blocks of substitute frame 42 as a function of motion vectors extending between a previous frame and a subsequent frame, e.g., as illustrated in the interpolation example of FIG. 2A or as a function of motion vectors motion vectors extending between two or more previous frames, e.g., as illustrated in the extrapolation example of FIG. 2B. In some instances, the motion vectors generated for substitute frame 42 may have different magnitudes and/or directions, which when used in interpolation or extrapolation generate a boundary 46 within substitute frame 42 that varies in thicknesses along the boundary, as illustrated in FIG. 3B.

As shown in FIG. 3B, boundary 46 in substitute frame 42 may extend further within substitute framed 42 at some locations than other locations, thus creating a boundary of varying thickness. Along the first column of blocks of substitute frame 42, for example, the portion of boundary 46 within the blocks in the first, third and fifth rows have the same boundary width as boundary 44 of reference frame 40, e.g., approximately one-quarter of the block width. The other blocks of the first column of blocks of substitute frame 42, however, either have a thicker boundary width or a thinner boundary width compared to the width of boundary 44 of reference frame 40. For example, the block of the fourth row of the first column of substitute frame 42 does not have any boundary at all, which is not the case in reference frame 40. As another example, the portion of boundary 46 within the blocks of the second and sixth row of the first column of substitute frame 42 have a boundary width equal to approximately one-half of the block and the portion of the boundary within the block of the seventh row of the first column of substitute frame 42 has a boundary width of approximately three-quarters of the block, which is about two and three times, respectively, the boundary width of corresponding blocks in reference frame 40. The portion of boundary 46 within the block of the eighth row of the first column of substitute frame 42 has a boundary width that is larger than the block of the eighth row. In other words, all the pixels of the block of the eighth row of the first column of substitute frame 42 are boundary pixels as well as about one-eighth of the pixels of the block in the second column and eighth row of substitute frame 42.

When frames 40, 42 are displayed as a sequence of frames, the boundary appears as if it is shaking during video playback due to boundary 44 of reference frame 40 varying significantly from boundary 46 of substitute frame 42. The result may be a less than desirable viewing experience. The boundary artifact correction techniques described in this disclosure may reduce, if not eliminate, the boundary artifacts within substituted frame 42. In fact, in most cases, the boundary artifacts may be fully corrected. In other words, the boundary artifact correction techniques correct the boundary artifacts such that the boundary within substituted frame 42 is substantially similar to boundary 44 of reference frame 40.

Although in the example illustrated in FIGS. 3A and 3B, boundary 44 extends along the left side of frames 40, 42, boundary 44 within frames 40, 42 may additionally or alternatively exist in other locations of frames 40, 42, as mentioned above. For example, a boundary may exist along a top of frames 40, 42, a bottom of frames 40, 42, a right side of frames 40, 42 or a combination thereof. Furthermore, the boundary may exist within frames 40, 42, such as in the case of picture-in-picture or video editing of two video sequences.

Figure 4:
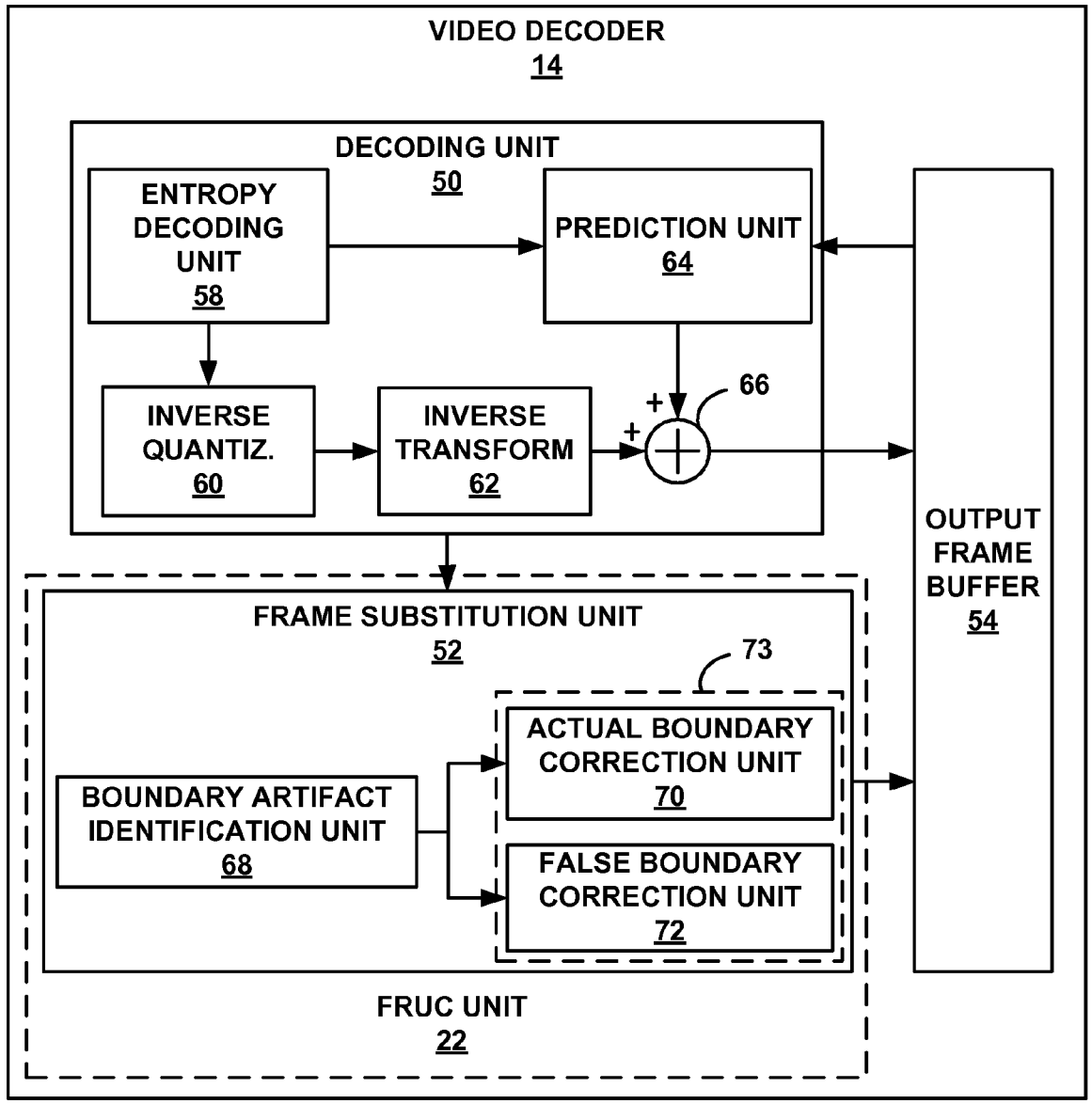
FIG. 4 is a block diagram illustrating an example of a video decoder configured to correct boundary artifacts within substitute video units.

FIG. 4 is a block diagram illustrating an example of video decoder 14 of FIG. 1 in more detail. In the example of FIG. 4, video decoder 14 includes a decoding unit 50, frame substitution unit 52 and output frame buffer 54. Frame substitution unit 52 corrects boundary artifacts within substituted frames in accordance with this disclosure. Frame substitution unit 52 may form part of FRUC unit 22 of video decoder 14. In the example of FIG. 4, frame substitution unit 52 resides within video decoder 14. However, frame substitution unit 52 may reside outside of video decoder 14 in other implementations, e.g., within a video post-processor module or video display processor or MDP device.

Video decoder 14 obtains frames received from transmission channel 19, e.g., from a frame buffer (not shown in FIG. 4). Decoding unit 50 decodes the received frames using an applicable coding process and places the decoded frames in output frame buffer 54. In the example illustrated in FIG. 4, video decoder 50 includes an entropy decoding unit 58, inverse quantization unit 60, inverse transform unit 62, prediction unit 64 and summer 66.

Entropy decoding unit 58 obtains encoded video frames, e.g., received frames 24 (FIG. 1), and entropy decodes the received video frames 24 to obtain residual information and header information for a plurality of blocks of each frame (or portion of each frame, e.g., slice). Entropy decoding unit 58 may decode received frames 24 using one or more entropy coding techniques, such as variable length coding, arithmetic coding, context adaptive variable length coding (CAVLC), context adaptive binary arithmetic coding (CABAC), or other entropy coding technique. As described above, the residual information, which may be in the form of one or more quantized residual coefficients, quantifies the differences between a prediction video block and an original video block encoded by video encoder 12. The header information may include information necessary to generate the prediction video block, such as whether to use inter or intra prediction, an intra prediction mode to use for intra prediction, one or more motion vectors for use in inter prediction, or the like.

Decoding unit 50 reconstructs each of the video blocks by generating and combining a prediction video block and a residual video block. For each inter-predicted block, prediction unit 64 obtains one or more motion vectors from entropy decoding unit 58 and one or more reconstructed video frames, e.g., from output frame buffer 54, and generates a motion compensated prediction block. For each intra-predicted block, prediction unit 64 obtains an intra prediction mode and one or more reconstructed video blocks of the same frame as the intra-predicted block and generates the prediction block in accordance with the intra prediction mode.

Decoding unit 50 may generate the residual block by providing the residual information to inverse quantization unit 60 to inverse quantize, i.e., de-quantize, the quantized residual coefficients and inverse transform unit 62 to apply an inverse transform, e.g., an inverse DCT or inverse 4×4 or 8×8 integer transform. Summer 66 sums the prediction block generated by prediction unit 64 with the residual block output by inverse transform unit 62 to form a reconstructed video block. The reconstructed video block is stored in output frame buffer 54.

Received frames 24 may exclude various frames to be interpolated or extrapolated. Such frames may include frames that were skipped by video encoder 12, frames that were not supported by the basic frame rate of encoder video 12, and/or frames or portions of frames that were lost during transmission across channel 19. To promote spatio-temporal quality, frame substitution unit 52 may be configured to generate one or more additional video frames, e.g., via interpolation or extrapolation.

Frame substitution unit 52 adds the substitute frames to video output frame buffer 54 to enhance the spatio-temporal quality of the reconstructed video. Frame substitution unit 52 may receive frames from the decoding unit 50 for use as reference frames in performing frame substitution, e.g., via interpolation or extrapolation. Frame substitution unit 52 may use the reference frames received from decoding unit 50 to generate additional frames for frame substitution, e.g., via motion compensated interpolation or extrapolation. As an illustration, frame substitution unit 52 may use motion vectors extending between a previous frame and a future frame to interpolate blocks in the substitute frame to be added, e.g., as shown in FIG. 2A. As another illustration, frame substitution unit 52 may use motion vectors extending between two or more previous frames to extrapolate blocks in the substitute frame to be added, e.g., as shown in FIG. 2B.

As described above, frame substitution, and particularly motion compensated frame substitution, may introduce boundary artifacts in the substitute frame that cause visual artifacts along the boundary in the video sequence, such as boundary shaking, flickering or blockiness. For example, the motion compensated interpolation or extrapolation may cause a boundary around a perimeter (or portion of the perimeter) of the substitute frame to be thicker or thinner than a boundary around a perimeter in the one or more reference frames, or the boundary in the substitute frame may vary in thicknesses along the boundary, e.g., as described above with respect to FIGS. 3A and 3B. In other words, the boundary within the substitute frame is not the same as the boundary within the one or more reference frames.

To improve the visual quality of the video, frame substitution unit 52 may correct boundary artifacts within the substitute frame when a boundary exists in the reference frame. If no boundary exists in the reference frame, frame substitution unit 52 may not perform boundary artifact correction. Instead, frame substitution unit 52 may generate the additional frame using conventional frame substitution techniques, e.g., interpolation or extrapolation. Thus, boundary artifact correction may, in some instances, only be performed if a boundary is found in the reference frame, e.g., along the top, bottom, left or right of the reference frame or, in some cases, within the reference frame (not along a perimeter of the reference frame).

Frame substitution unit 52 may identify locations within the substitute frame that correspond to boundary artifacts and correct the boundary artifacts within the identified locations. Frame substitution unit 52 may include a boundary artifact identification unit 68 that identifies locations that include boundary artifacts. Boundary artifact identification unit 68 may identify first locations within the substitute frame, referred to as actual boundary locations, that correspond to locations at which a boundary exists within the reference video frame and should exist within the substitute frame. The actual boundary locations may, in some instances, include boundary artifacts resulting from motion compensated frame substitution. For example, the actual boundary locations may include boundary artifacts at which the boundary is removed or does not extend far enough into the substitute frame due to motion compensated prediction, e.g., as illustrated in the block of the fourth row and first column of blocks in FIG. 3B.

Boundary artifact identification unit 68 may also identify second locations within the substitute frame, referred to as false boundary locations, which correspond to locations at which a boundary exists in the substitute frame, but does not exist within the reference frame. The false boundary locations include boundary artifacts resulting from motion compensated interpolation, such as a boundary that extends further into the substitute frame than the corresponding boundary location in the reference frame, e.g., as illustrated in the blocks of the second, sixth, seventh row of the first column of blocks and eighth row of the first and second column of blocks in FIG. 3B.

Boundary artifact identification unit 68 may identify the actual boundary locations and false boundary locations using motion vectors associated with the blocks of the substitute frame and/or a width of the boundary that exists within the reference frame. As described in detail with respect to FIGS. 2A and 2B, a substitute frame may be interpolated or extrapolated using one or more reference frames. In particular, frame substitution unit 52 may compute motion vectors for the blocks of the substitute frame as a function of motion vectors associated with the one or more reference frames, and use the computed motion vectors to generate the substitute frame. In the case of interpolation using a first reference frame located temporally prior to the substitute frame and a second reference frame located temporally after the substitute frame, for example, frame substitution unit 52 may generate a motion vector for a block of the substitute frame that is equal to one-half of the motion vector that extends between the first and second reference frame.

To identify actual and false boundary locations, boundary artifact identification unit 68 analyzes blocks of pixels along the boundary. In the case of a boundary located along a left perimeter or a right perimeter of the frame, for example, boundary artifact identification unit 68 may analyze pixels along columns on the left side of the frame or along columns on the right hand side of the frame, respectively. In the case of a boundary located along a top or bottom perimeter, on the other hand, boundary artifact identification unit 68 may analyze pixels along rows on the top of the frame or along rows on the bottom of the frame, respectively.

Boundary artifact identification unit 68 may, for example, analyze motion vectors associated with the blocks to determine whether any boundary artifacts exist within the block. To identify boundary artifacts in the blocks of the frame, boundary artifact identification unit 68 analyzes an x-component of the motion vectors associated with blocks for each of the blocks that correspond with a left or right boundary and analyzes a y-component of the motion vectors associated with the blocks for each of the blocks that correspond to a top or bottom boundary.

For blocks along a left or right boundary, boundary artifact identification unit 68 determines there are no boundary artifacts if a motion vector of the block has an x-component equal to zero. Likewise, for blocks along a top or bottom boundary, boundary artifact identification unit 68 determines there are no boundary artifacts if a motion vector of the block has a y-component equal to zero. This is because the boundary will not be propagated further within the block via motion compensation. Instead, the block of the substitute frame will be a copy of the corresponding block from the reference frame.

If the respective component of the motion vector of the block, e.g., x-component for left and right boundaries and y-component for top and bottom boundaries, has a nonzero magnitude, boundary artifact identification unit 68 identifies actual and/or false boundary locations within the block. In one aspect, boundary artifact identification unit 68 may identify a first portion of the block as the actual boundary location and a second portion of the block as the false boundary location.

For a boundary located along a left side of the frame, for example, boundary artifact identification unit 68 may identify the first W columns of pixels of the block as actual boundary locations, where W is equal to a width, in pixels, of the boundary within the reference frame. If the x-component of the motion vector of the block has a positive magnitude, for example, boundary artifact identification unit 68 may identify a number of columns of pixels of the block equal to the positive magnitude and adjacent to the actual boundary location as the false boundary location. In this case, a positive magnitude motion vector points to a block in the reference frame located in the negative x-direction. If the boundary is a left boundary and the x-component of the motion vector is equal to $MV_x$, for example, boundary artifact identification unit 68 may identify columns $W+1$ through $W+MV_x$ as false boundary locations. If the boundary is a left boundary and the x-component of the motion vector of the block has a negative magnitude, for example, boundary artifact identification unit 68 may not identify any of the pixels within the block as belonging to a false boundary location. This is because the boundary will not be propagated further within the frame due to motion compensation. Although in the example described above, a positive magnitude of the x-component of the motion vector is described as corresponding with motion toward the right side of the video frame and the negative magnitude of the x-component of the motion vector is described as corresponding with motion toward the left side of the video frame, different motion vector magnitude (sign) conventions may be used. For example, a positive magnitude of the x-component of the motion vector is described as corresponding with motion toward the left side of the video frame and the negative magnitude of the x-component of the motion vector is described as corresponding with motion toward the right side of the video frame.

For a boundary located along a right side of the frame, boundary artifact identification unit 68 analyzes different blocks and uses the x-component of the associated motion vectors differently. Boundary artifact identification unit 68 may identify the last W columns of pixels of the substitute frame, i.e., columns N to N−W, as actual boundary locations, where W is equal to a width, in pixels, of the boundary of the reference frame and N is equal to the total number of columns of pixels. If the x-component of the motion vector of the block has a negative magnitude, boundary artifact identification unit 68 may identify a number of columns of pixels equal to the negative magnitude and adjacent to the actual boundary location as the false boundary location. If the boundary is a right boundary and the x-component of the motion vector is equal to $-MV_x$, for example, boundary artifact identification unit 68 may identify columns N−W−1 through N−W−$MV_x$ as false boundary locations. If the boundary is a right boundary and the x-component of the motion vector of the block has a positive magnitude, boundary artifact identification unit 68 may not identify any of the pixels within the block as belonging to a false boundary location. This is because the boundary will not be propagated further within the frame due to motion compensation. Boundary artifact identification unit 68 may identify actual and false boundary locations in a similar way along a top and bottom boundary using the y-components of the motion vectors associated with the blocks.

In other aspects, boundary artifact identification unit 68 may identify entire blocks as actual boundary locations or false boundary locations, instead of portions of the block as described above. If a block includes any pixels corresponding to a location of a boundary of the reference frame, boundary artifact identification unit 68 may classify the block as an actual boundary location. For example, if the boundary is a left boundary with a width of W pixels, boundary artifact identification unit 68 may identify blocks that include any pixels of the first W columns of pixels as actual boundary locations. If W is equal to seven and the blocks of the substitute frame are 4×4 blocks, boundary artifact identification unit 68 identifies the first two columns of 4×4 blocks as actual boundary locations. In other words, W is rounded to the nearest multiple of the size of the basic unit used for motions compensation, e.g., for a basic unit or block size of N×N, the width W is rounded to the nearest multiple of N. In the 4×4 block size example above, the W value of seven is rounded to eight, resulting in two columns of blocks being identified as actual boundary locations. Depending on the size of the basic unit of motion compensation, different rounding may occur. For example if the size of the basic unit for motion compensation is 2×2 blocks, then a width W of the boundary is rounded to the nearest multiple of two. In the case of a 2×2 block, a W of seven is still rounded to eight, but the result is four columns of 2×2 blocks identified as actual boundary locations. As another example, if the basic motion compensation unit is 8×8, a W value to 5 is rounded to 8, resulting in a single column of 8×8 blocks identified as actual boundary locations. Rounding may not be necessary if not bounded by any video architecture. However, to make use of the motion compensation module of the video processor, than rounding depends on the basic motion compensation unit of the video processor/decoder.

Thus, even blocks that include some pixels that do not correspond to the boundary in the reference frame may be classified as actual boundary locations if at least one pixel of the boundary corresponds to the location of the boundary in the reference frame. Boundary artifact identification unit 68 may determine the number of columns of blocks that are identified as actual boundary locations using a ceiling function, as described in further detail with respect to FIG. 5.

In some instances, boundary artifact identification unit 68 may characterize blocks that do not have any pixels that correspond with the boundary in the reference frame as actual boundary locations. If the boundary width of the boundary in the reference frame is a multiple of the block size, boundary artifact identification unit 68 may identify an adjacent block as an actual boundary location. This may be necessary, for example, to correct false boundary artifacts using intra prediction as described in detail below. For example, a left or right boundary with a width of 12 pixels may result in four columns of blocks being identified as actual boundary locations, e.g., in the case of 4×4 blocks, even though the boundary only extends through three columns of blocks.

Boundary artifact identification unit 68 may identify blocks as false boundary locations when the motion vector associated with the block causes the boundary to be propagated into a block that does not include any pixels that correspond to locations of the boundary in the reference frame. An example for identifying the false boundary locations (blocks in this case) that correspond to the artifacts can be explained as follows. For a left boundary of a video unit, boundary artifact identification unit 68 processes each block in a row starting from a left side of the video unit. Let K represent the number of blocks in a row that are analyzed (i.e., blocks 1 to K are analyzed), and R be the total number of rows of blocks. For each of blocks 1 to K, boundary artifact identification unit 68 obtains a motion vector associated with the block. Boundary artifact identification unit 68 calculates a horizontal pixel coordinate of the left corner of the block that will be fetched from reference frame, e.g., the block obtained during motion compensation using the motion vector associated with the block of the substitute frame. If the horizontal pixel coordinate is less than a left boundary width, then boundary artifact identification unit 68 identifies this block as a false boundary location. In other words, boundary artifact identification unit 68 identifies the block as a location that needs artifact correction, e.g., via intra prediction or other pixel replacement methodology. Additionally, boundary artifact identification unit 68 may label a corresponding location of the block in an artifact location map, e.g., with "1," indicating that the block corresponding to the location on the map needs boundary artifact correction. Boundary artifact identification unit 68 may move to the next block in the same row and repeat the same process until all K blocks of the row have been analyzed. After analyzing the K blocks of the first row, boundary artifact identification unit 68 may analyze K blocks in the next row until all the rows have been analyzed. After all rows have been analyzed, boundary artifact identification unit 68 may move to a right boundary, if one exists.

For the right boundary, boundary artifact identification unit 68 follows a similar procedure. Boundary artifact identification unit 68 may process the last P blocks in a row that are in the right boundary of the video unit. For each block, boundary artifact identification unit 68 first obtains the motion vector of the block. Boundary artifact identification unit 68 then calculates the horizontal pixel coordinate of the right corner of the block that will be fetched from the reference frame during motion compensation. If the horizontal pixel coordinate is larger than the starting coordinate of the right boundary (e.g., a left-most coordinate of the right boundary), then boundary artifact identification unit 68 identifies the block as an area that needs artifact correction and labels the corresponding location of the block in the location map with a "1." Boundary artifact identification unit 68 may move to the previous block in the same row and repeat the analysis for the P blocks. After analyzes the P blocks of the first row, boundary artifact identification unit 68 may analyze P blocks in the next row until all R rows have been analyzed. After all rows have been analyzed, boundary artifact identification unit 68 may move to a north (or top) boundary, if one exists.

For the north boundary, boundary artifact identification unit 68 follows a similar procedure. Boundary artifact identification unit 68 may start processing each block in a column that are in the north side of the video unit. Let T represent the number of blocks in a column that are analyzed, and C be the total number of columns of blocks. Boundary artifact identification unit 68 processes the first T blocks in a column that are in the north boundary of the video unit. For each block, boundary artifact identification unit 68 may first obtain the motion vector of the block. Boundary artifact identification unit 68 may calculate the vertical pixel coordinate of a bottom of the block that will be fetched from reference frame during motion compensation. If the vertical pixel coordinate is greater than the bottom-most or south-most boundary coordinate of the top boundary, then boundary artifact identification unit 68 identifies the block as an area that needs artifact correction and labels the corresponding location of the block in the location map with "1." Boundary artifact identification unit 68 may move to the next block in the same column and repeat the same process until T blocks of the column have been analyzed. After T blocks of all the C columns are analyzed, boundary artifact identification unit 68 may move to a south boundary, if one exists.

Similarly in south boundary, for each block, boundary artifact identification unit 68 may first obtain the motion vector of the block. Boundary artifact identification unit 68 may calculate the vertical pixel coordinate of the north (top) of the block that will be fetched from reference frame during motion compensation. If the vertical pixel coordinate is smaller than the top-most or north-most boundary coordinate of the south boundary, then boundary artifact identification unit 68 may identify this block as an area that needs artifact correction and label the corresponding location of the block in the location map with "1." Boundary artifact identification unit 68 may move to the next block in the same column and repeat the same process until B blocks of the column have been analyzed.

The process described above is one example of how the false boundary locations may be identified. The process should not be considered limiting of the techniques described herein. For example, the false boundary identification is not dependent on the order in which the artifacts are identified. In other words, the process may begin with the south boundary, north boundary, left boundary or right boundary. Other false boundary location identification techniques may be used. For example, boundary ratification identification unit 68 may identify the boundary locations based on the motion vectors associated with the block instead of or in addition to the pixel coordinates. If the boundary is a left boundary, for instance, and the x-component of the motion vector is equal to positive $MV_x$, boundary artifact identification unit 68 may identify a block that is located adjacent to the current block being analyzed as a false boundary location when $MV_x$ is greater than the output of the ceiling function used to identify actual boundary locations multiplied by the block size.

Frame substitution unit 52 corrects the identified locations using the techniques of this disclosure to create a boundary within the substitute frame that is substantially similar to the boundary of the reference frame, thereby preserving temporal continuity of the boundary and removing shakiness of the boundary. Frame substitution unit 52 includes boundary artifact correction unit 73 that corrects boundary artifacts within the substitute frame. Boundary artifact correction unit 73 may include an actual boundary correction unit 70 and a false boundary correction unit 72 that correct boundary artifacts in actual boundary locations and false boundary locations, respectively. In some instances, boundary correction units 70, 72 may correct the boundary artifacts in the identified locations in the pixel domain. In other words, boundary correction units 70, 72 may adjust the pixel values within the identified locations on a pixel-by-pixel basis.

For example, to correct artifacts in actual boundary locations in the substitute frame, i.e., locations that correspond with a boundary that exists within a reference frame used to generate the substitute frame and should exist within the substitute frame, actual boundary correction unit 70 may replace each of the pixel values within the actual boundary locations in the substitute frame with pixel values from corresponding locations in the reference frame. In effect, the boundary of the reference frame is copied into the boundary of the substitute frame by actual boundary correction unit 70. As another example, actual boundary correction unit 70 may set each of the pixel values of the actual boundary location equal to a pixel value associated with the color of the boundary in the reference frame.

To correct false boundary locations in the pixel domain, false boundary correction unit 72 may compute a replacement pixel value for each of the pixels within the false boundary locations, i.e., locations that correspond with a boundary that exists within the substitute video frame and does not exist within the reference video frame used to generate the substitute frame, using one or more pixel values of one or more reference frames. False boundary correction unit 72 may, in some instances, compute a replacement pixel value for each of the pixels within the false boundary location to be an average of pixel values of two pixels in the reference frame that are located in the corresponding row to the row of the pixel of the substitute frame being replaced and immediately adjacent to the boundary in the reference frame.

For example, for a left boundary with a width of four pixels, false boundary correction unit 72 may compute a replacement pixel value for a fifth pixel of the first row of the substitute frame by averaging pixel values associated with a fifth and sixth pixel of the first row of the reference frame, which are immediately adjacent to the boundary. Likewise, false boundary correction unit 72 may compute a replacement pixel value for a fifth pixel of the second row of the substitute frame by averaging pixel values associated with a fifth and sixth pixel of the second row of the reference frame and so on. False boundary correction unit 72 may compute the replacement pixels using more or fewer pixel values from the reference frame, using pixel values from different locations within the pixel frame, e.g., different rows or columns, or using a combination of pixel values from the reference frame and previously computed pixel values of the substitute frame. In this manner, frame substitution unit 52 may correct boundary artifacts in actual boundary locations using a first correction technique and correct boundary artifacts in false boundary location using a second correction technique to generate a boundary in the substitute frame is substantially the same as the boundary in the reference frame.

In other instances, frame substitution unit 52 may correct the identified locations in the compressed domain, e.g., prior to pixel values being generated for the substitute frame. As described above, the identified locations in the compressed domain may be entire blocks of pixels instead of portions of the pixels of the block. For blocks in the substitute frame identified as actual boundary locations, e.g., blocks that include at least one pixel that is determined to correspond to the boundary of the reference frame, actual boundary correction unit 70 may correct boundary artifacts by setting motion vectors associated with the blocks equal to zero. Setting the motion vectors associated with the blocks equal to zero causes frame substitution unit 52 to generate the block in the substitute frame by copying the corresponding block in the reference frame to generate the blocks of the additional frame using motion compensation. As such, the blocks in the substituted frame corresponding to actual boundary locations will have the same boundary as the boundary of the reference frame after construction the additional frame using motion compensation.

To correct false boundary locations in the compressed domain, e.g., blocks that include at least one pixel of the block corresponds to a boundary within the substituted frame that does not exist in the reference frame, but does not include any pixels that correspond to the boundary of the reference frame, false boundary correction unit 72 may correct the artifacts by selecting an intra prediction mode and determining the pixel values of the block using the selected intra prediction mode. In the case of 4×4 blocks, for example, false boundary correction unit 72 may select one of the intra prediction modes available in the coding technique. For H.264, for example, false boundary correction unit 72 may select one of nine intra prediction modes as follows: vertical mode, horizontal mode, DC mode, diagonal downright mode, diagonal downleft mode, vertical right mode, horizontal down mode, vertical left mode and horizontal up mode. In this manner, video decoder 14 may identify at least two different types of boundary artifacts and correct the boundary artifacts in different manners.

In some aspects, boundary artifact prediction unit 56 may be capable of correcting boundary artifacts in either the pixel domain or the compressed domain. In this case, boundary artifact correction unit 56 may adaptively select whether to correct boundary artifacts in the pixel domain or the compressed domain, e.g., to achieve an optimal quality-power tradeoff. Correcting boundary artifacts in the pixel domain may result in a better quality than correcting boundary artifacts in the compressed domain. However, correcting boundary artifacts in the compressed domain does not require accessing particular pixel data and may be performed using less power consumption and MIPS. As one example, boundary artifact correction unit 73 may perform boundary artifact correction in the pixel domain when there are no causal pixels available for intra prediction and perform boundary artifact correction in the compressed domain when causal pixels are available for intra prediction.

The decoded frames and substitute frames in video output frame buffer 54 may be used to drive a video output device such as a display (not shown in FIG. 4). As an example, video decoder 14 may form part of any of a variety of devices including digital video capabilities, including a wireless communication device such as a mobile radio telephone, a digital media player, a personal digital assistant (PDA), a digital television, or the like. Alternatively, the frames in output frame buffer 54 may be transmitted to one or more other devices for archival or display. In either case, the substitute frames produced by frame substitution unit 52 supplement frames decoded by decoding unit 50, e.g., to enhance temporal visual quality of a video clip.

Figure 5:
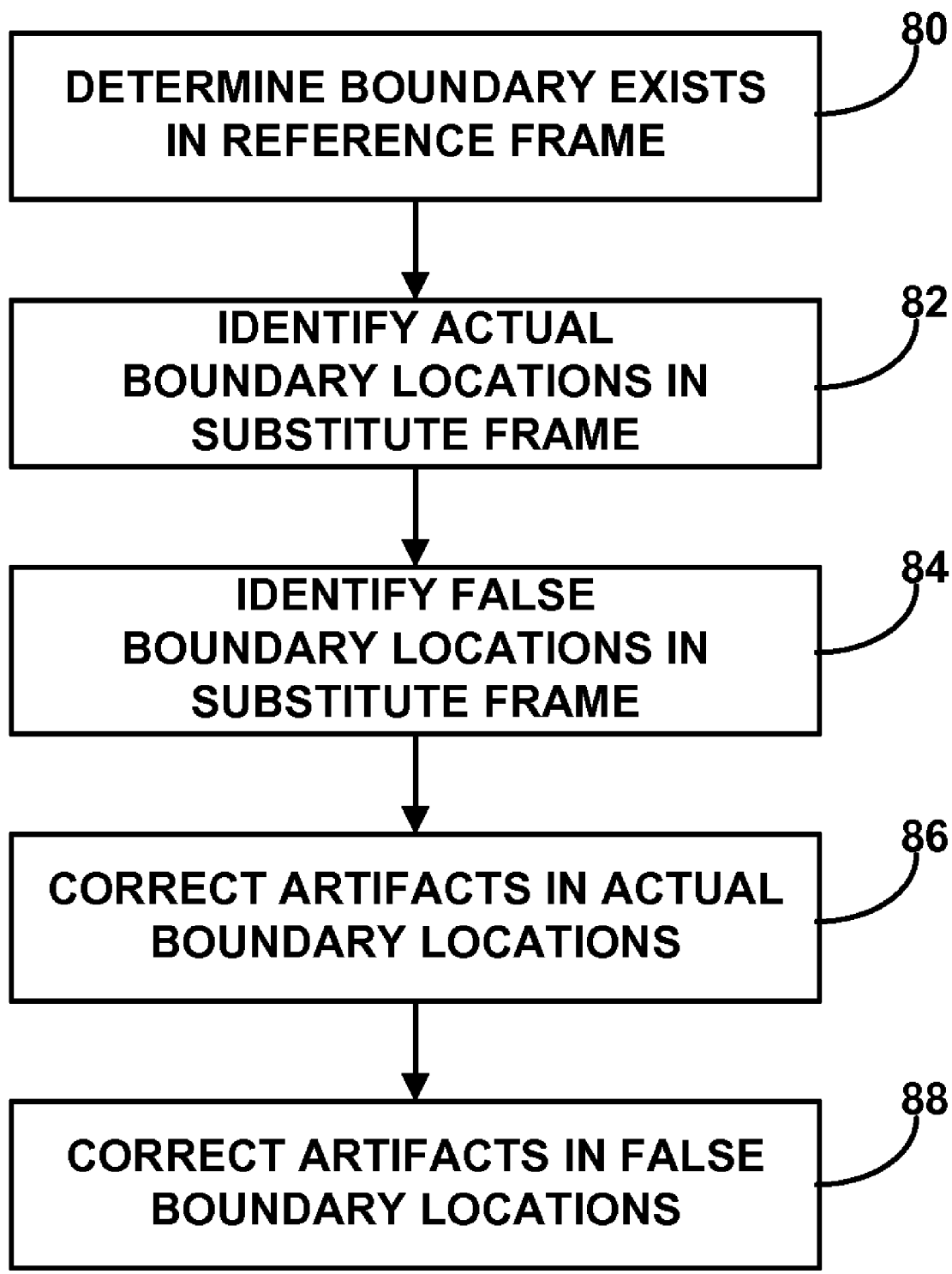
FIG. 5 is a flow diagram illustrating example operation of a frame substitution unit correcting boundary artifacts in substitute frames.

FIG. 5 is a flow diagram illustrating example operation of frame substitution unit 52 correcting boundary artifacts in substitute frames in accordance with the techniques of this disclosure. Frame substitution unit 52 may determine that a boundary exists in a reference frame (80). The boundary may exist around at least a portion of the perimeter of the reference frame (e.g., along a top, bottom, left side and/or right side of the frame). Alternatively, or additionally, the boundary may exist elsewhere within the reference frame, e.g., not along the perimeter, as may be the case for a frame that includes more than one video sequence edited together or in a picture-in-picture scenario.

Upon identifying a boundary within the reference frame, boundary artifact identification unit 68 identifies first locations within the substitute frame, referred to as actual boundary locations, that correspond to locations at which a boundary exists within the reference video frame and should exist within the substitute frame (82). The actual boundary locations may include artifacts resulting from motion compensated frame substitution. For example, the actually boundary locations may include boundary artifacts at which the boundary is removed or does not extend far enough into the substitute frame due to motion compensated prediction, e.g., as illustrated in the block of the fourth row and first column of blocks in FIG. 3B.

Boundary identification unit 68 may identify actual boundary locations within the substitute frame based on a width of the boundary within the reference frame. In one aspect, boundary identification unit 68 may analyze each block and identify a portion of the block as an actual boundary location based on the width of the boundary within the reference frame. As an example, if the boundary in the reference frame is located along a left side of the reference frame, boundary artifact identification unit 68 may identify the first W columns of pixels of the blocks of the first column of blocks in the substitute frame as actual boundary locations, where W is equal to the width, in pixels, of the boundary within the reference frame. In another aspect, boundary identification unit 68 may identify entire blocks as actual boundary locations even if the block includes pixels that do not correspond to the boundary within the reference frame. For example, if the boundary in the reference frame is a left boundary, boundary artifact identification unit 68 may compute the number of columns of blocks in the substitute frame that are actual boundary locations using a ceiling function, e.g., ceiling (x, y). The output of the ceiling function rounds x divided by y up to the next largest integer value. For example, ceiling of (7, 4)=2. Thus, a left or right boundary with a width of the boundary of seven pixels results in two columns of blocks being identified as actual boundary locations, e.g., in the case of 4×4 blocks.

In some instances, boundary artifact identification unit 68 may characterize blocks that do not have any pixels that correspond with the boundary in the reference frame as actual boundary locations. If the boundary width of the boundary in the reference frame is a multiple of the block size, boundary artifact identification unit 68 may identify an adjacent block as an actual boundary location. This may be necessary, for example, to correct false boundary artifacts using intra prediction as described in detail below. For example, a left or right boundary with a width of 12 pixels may result in four columns of blocks being identified as actual boundary locations, e.g., in the case of 4×4 blocks, even though the boundary only extends through three columns of blocks.

Boundary artifact identification unit 68 also identifies second locations within the substitute frame, referred to as false boundary locations, which correspond to locations at which a boundary exists in the substitute frame, but does not exist within the reference frame (84). The false boundary locations include boundary artifacts resulting from motion compensated interpolation, such as a boundary that extends further into the substitute frame than the corresponding boundary location in the reference frame, e.g., as illustrated in the blocks of the second, sixth, seventh and eighth row of the first column of blocks in FIG. 3B.

Boundary identification unit 68 may identify false boundary locations within the substitute frame based on a width of the boundary within the reference frame and the estimated, interpolated or processed motion vectors associated with the blocks. In one aspect, boundary identification unit 68 may analyze each block and identify a portion of the block as a false boundary location based on the width of the boundary within the reference frame and the motion vector of the respective block. If the boundary is a left boundary and the x-component of the motion vector is equal to $MV_x$, for example, boundary artifact identification unit 68 may identify columns W+1 through W+$MV_x$ as false boundary locations, where W is the width of the boundary in the reference frame. In another aspect, boundary identification unit 68 may identify entire blocks as false boundary locations. Boundary artifact identification unit 68 may identify blocks as false boundary locations when the motion vector associated with the block causes the boundary to be propagated into a block that does not include any pixels the correspond to locations of the boundary in the reference frame. For example, if the boundary is a left boundary, boundary artifact identification unit 68 identifies the block as a false boundary location when a horizontal pixel coordinate of the left corner of the block fetched from reference frame during motion compensation is less than a left boundary width.

Actual boundary correction unit 70 corrects boundary artifacts in actual boundary locations (86). In some instances, actual boundary correction unit 70 corrects the boundary artifacts in the identified actual boundary locations in the pixel domain. For example, to correct artifacts in actual boundary locations in the substitute frame, actual boundary correction unit 70 may replace each of the pixel values within the actual boundary locations in the substitute frame with pixel values from corresponding locations in the reference frame. In this manner, the boundary of the reference frame is copied into the boundary of the substitute frame. In other instances, actual boundary correction unit 70 corrects the boundary artifacts in the actual boundary locations in the compressed domain. For example, actual boundary correction unit 70 may correct boundary artifacts by setting the motion vectors associated with the blocks identified as actual boundary locations equal to zero, and performing motion compensation using those motion vectors.

False boundary correction unit 72 corrects boundary artifacts in false boundary locations (88). To correct false boundary locations in the pixel domain, false boundary correction unit 72 may compute a replacement pixel value for each of the pixels within the false boundary locations using one or more pixel values of one or more reference frames. For example, false boundary correction unit 72 may compute a replacement pixel value for each of the pixels within the false boundary location to be an average of pixel values of two pixels in the reference frame that are located in the same row as the pixel of the substitute frame being replaced and immediately adjacent to the boundary in the reference frame. To correct false boundary locations in the compressed domain, for example, false boundary correction unit 72 selects an intra prediction mode and determines the pixel values of the block using the selected intra prediction mode. In addition to or separately from H.264 intra prediction, different spatial interpolation techniques could also be used to correct false boundary artifacts.

Figure 6A:
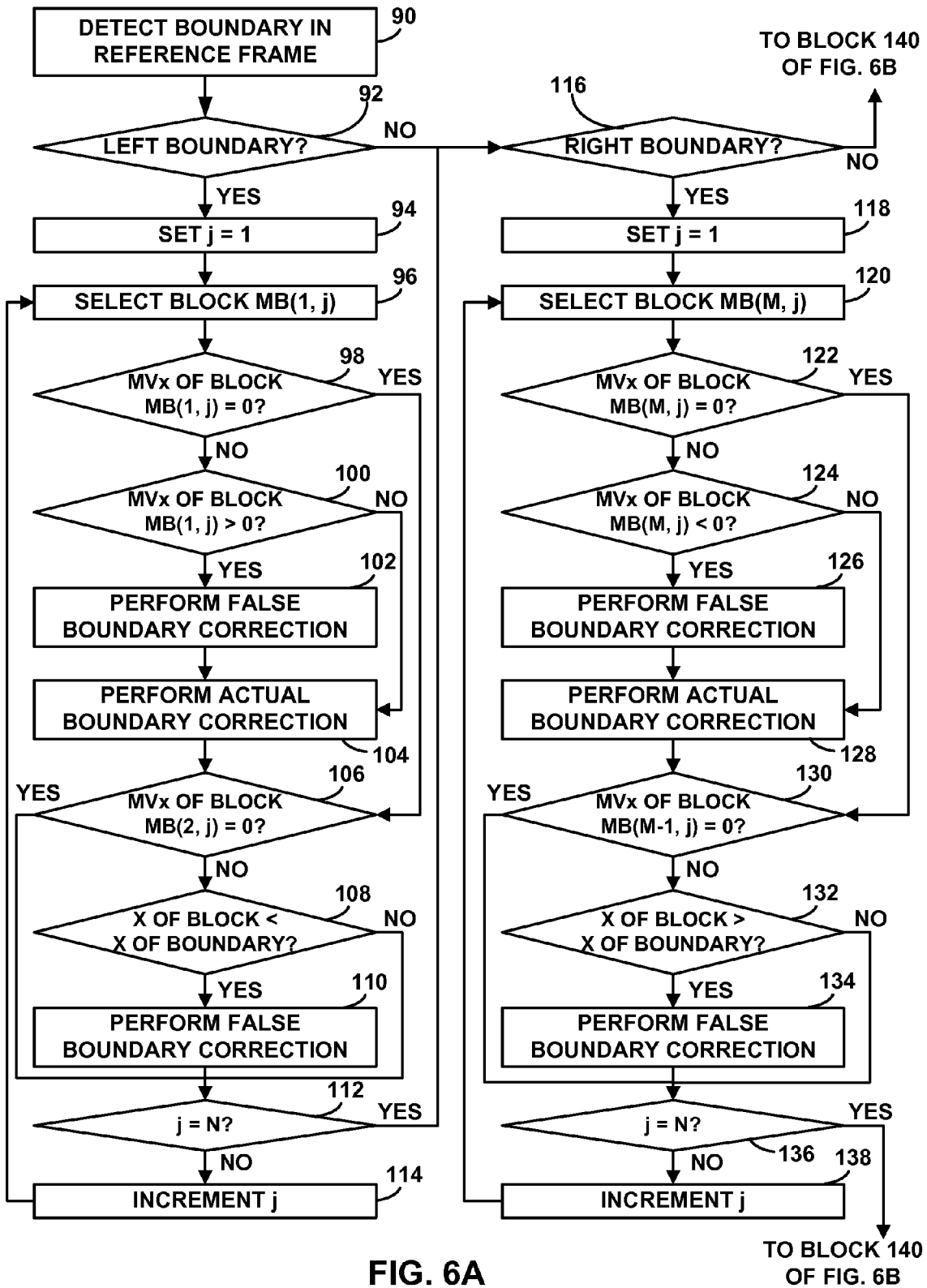
FIGS. 6A and 6B are flow diagrams illustrating example operation of a frame substitution unit correcting boundary artifacts of one row and/or column of pixels along an identified boundary.
Figure 6B:
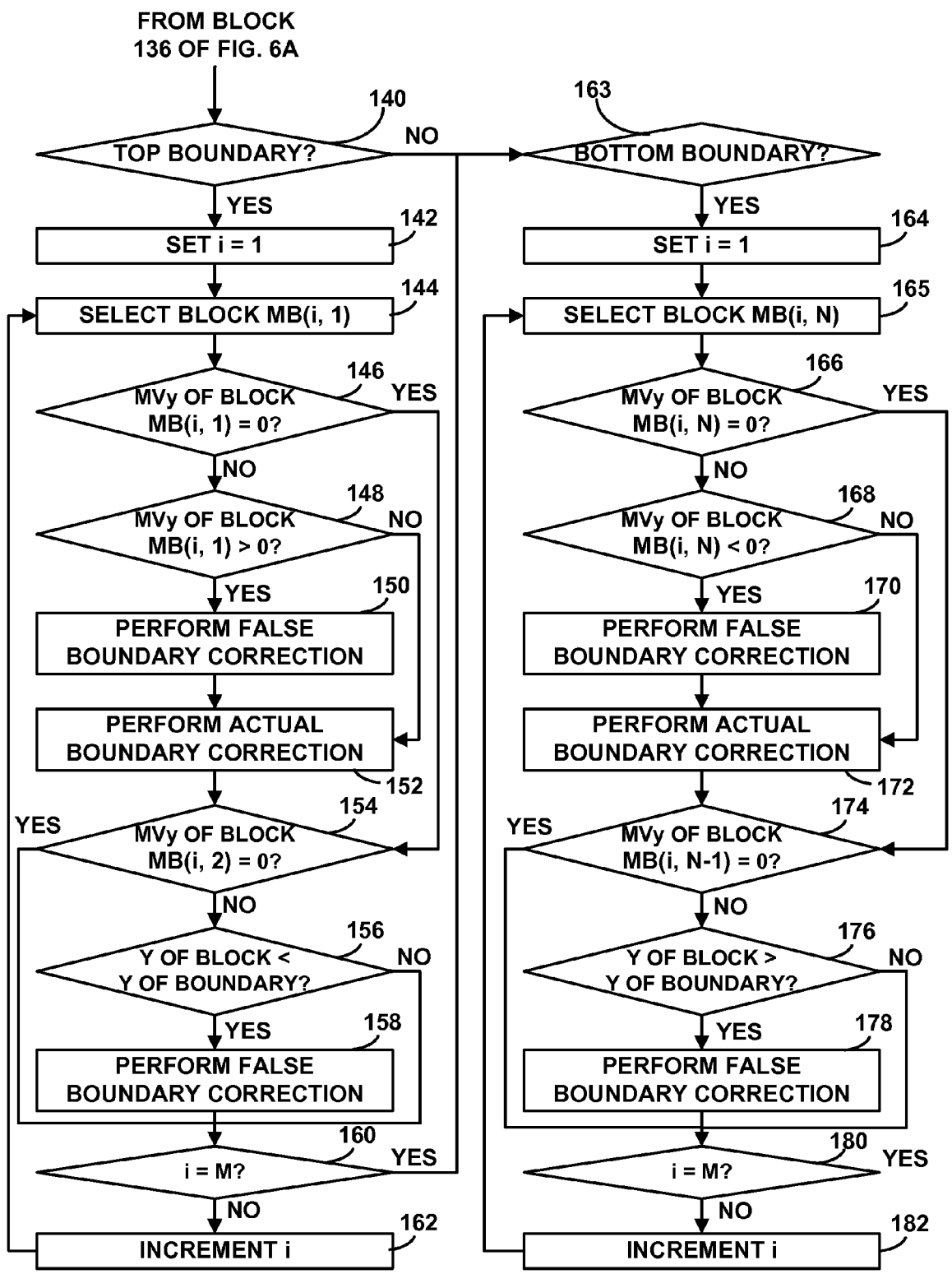

FIGS. 6A and 6B are flow diagrams illustrating example operation of a frame substitution unit 52 in correcting boundary artifacts of one row and/or column of pixels along an identified boundary. Although the example illustrated in FIGS. 6A and 6B shows boundary artifact correction along a single row and/or single column, the techniques may be performed on multiple rows and/or multiple columns. The number of rows or columns may be determined based on a width of a boundary in a reference frame.

Initially, frame substitution unit 52 detects a boundary within the reference frame used for frame substitution (90). Frame substitution unit 52 determines whether the boundary extends along a left side of the reference frame, i.e., is a left boundary (92). If the boundary in the reference frame extends along the left side of the reference frame, i.e., is a left boundary, frame substitution unit 52 sets a variable j=1 and selects block MB(1, j) of the substituted frame (94, 96). Block MB(1, j) is the block located at the first column and the $j^{th}$ row. Because j is initially set equal to 1, the first block selected is the block of the first column and first row of the substituted frame.

Frame substitution unit 52 determines whether an x-component of a motion vector ($MV_x$) associated with block MB(1, j) is equal to zero (98). The motion vector associated with block MB(1,j) may, in some instances, be computed as a function of motion vectors associated with the one or more reference frames, e.g., via interpolation or extrapolation. When frame substitution unit 52 determines that the x-component of the motion vector associated with block MB(1, j) of the substituted frame is not equal to zero, frame substitution unit 52 determines that the x-component of the motion vector associated with block MB(1, j) of the substituted frame is greater than zero (100). If frame substitution unit 52 determines that the x-component of the motion vector associated with block MB(1, j) of the substituted frame is greater than zero, frame substitution unit 52 performs false boundary correction (102). False boundary correction may be performed in the pixel domain or the compressed domain as described in detail in this disclosure.

After performing false boundary correction or when the x-component of the motion vector associated with block MB(1, j) is less than zero, frame substitution unit 52 performs actual boundary correction (104). Like false boundary correction, actual boundary correction may be performed in the pixel domain or the compressed domain as described in detail in this disclosure. In this manner, frame substitution unit 52 performs uses different boundary artifact correction techniques to correct different types of boundary artifacts. For example, boundary artifacts associated with actual boundary locations are corrected using one of the actual boundary correction techniques and boundary artifacts associated with false boundary locations are corrected using one of the false boundary correction techniques.

After actual boundary correction or when the x-component of the motion vector associated with the block is equal to zero, frame substitution unit 52 determines whether an x-component of a motion vector associated with a block MB(2, j) is equal to zero (106). Block MB(2, j) is the block located at the second column and the $j^{th}$ row. In other words, block MB(2, j) is the block immediately adjacent in the horizontal direction to block MB(1, j). When the x-component of the motion vector associated with block MB(2, j) is not equal to zero, frame substitution unit 52 determines whether a horizontal x-coordinate of a left side of a block fetched from the reference frame during motion compensation ("X OF BLOCK") is less than an x-coordinate of a right side of the left boundary ("X OF BOUNDARY") (108). If frame substitution unit 52 determines that the x-coordinate of the left side of the block fetched from the reference frame during motion compensation ("X OF BLOCK") is less than the x-coordinate of a right side of the left boundary, frame substitution unit 52 performs false boundary correction for block MB(2, j) (110). FIG. 6.A only analyzes and corrects boundary artifacts in the first and second blocks of a row, i.e., blocks MB(1, j) and MB(2, j). However, the techniques may analyze and correct boundary artifacts in more blocks of the rows, e.g., blocks MB(3, j), MB(4, j), . . . , MB(C, j), where C is equal to the number of columns of the frame.

When the x-component of the motion vector associated with block MB(2, j) is equal to zero, the x-coordinate of the left side of the block fetched from the reference frame during motion compensation ("X OF BLOCK") is not less than the x-coordinate of a right side of the left boundary, or after false boundary correction of block MB(2, j), frame substitution unit 52 determines whether the variable j is equal to N, where N is the number of blocks of the first column (112). When j is not equal to N, frame substitution unit 52 increments variable j (114) and processes block MB(1, j) in the manner described above. Frame substitution unit 52 continues to process the blocks inthe left column until j is equal to N, i.e., there are no more remaining blocks to process.

When j is equal to N or the boundary is determined at block (92) to not be a left boundary, frame substitution unit 52 determines whether the boundary extends along a right side of the reference frame, i.e., is a right boundary (116). If frame substitution unit 52 determines the boundary in the reference frame extends along the right side of the reference frame, i.e., is a right boundary, frame substitution unit 52 sets a variable j=1 and selects block MB(M, j) of the substituted frame (118, 120). Block MB(M, j) is the block located at the $M^{th}$ column and the $j^{th}$ row. Because j is initially set equal to 1, the first block selected is the block of the last column and first row of the substitute frame.

Frame substitution unit 52 determines whether an x-component of a motion vector ($MV_x$) associated with block MB(M, j) is equal to zero (122). The motion vector associated with block MB(M, j) may, in some instances, be computed as a function of motion vectors associated with the one or more reference frames, e.g., via interpolation or extrapolation. When frame substitution unit 52 determines that the x-component of the motion vector associated with block MB(M, j) of the substituted frame is not equal to zero, frame substitution unit 52 determines that the x-component of the motion vector associated with block MB(M, j) of the substituted frame is less than zero (124). If frame substitution unit 52 determines that the x-component of the motion vector associated with block MB(M, j) of the substituted frame is less than zero, frame substitution unit 52 performs false boundary correction (126). False boundary correction may be performed in the pixel domain or the compressed domain as described in detail in this disclosure.

After performing false boundary correction or when the x-component of the motion vector associated with block MB(M, j) is greater than zero, frame substitution unit 52 performs actual boundary correction (128). Like false boundary correction, actual boundary correction may be performed in the pixel domain or the compressed domain as described in detail in this disclosure. In this manner, frame substitution unit 52 performs uses different boundary artifact correction techniques to correct different types of boundary artifacts. For example, boundary artifacts associated with actual boundary locations are corrected using one of the actual boundary correction techniques and boundary artifacts associated with false boundary locations are corrected using one of the false boundary correction techniques.

After actual boundary correction or when the x-component of the motion vector associated with the block is equal to zero, frame substitution unit 52 determines whether an x-component of a motion vector associated with a block MB(M−1, j) is equal to zero (130). Block MB(M−1, j) is the block located at the second to last column and the $j^{th}$ row. In other words, block MB(M−1, j) is the block immediately adjacent in the negative horizontal direction to block MB(M, j). When the x-component of the motion vector associated with block MB(M−1, j) is not equal to zero, frame substitution unit 52 determines whether a horizontal x-coordinate of a right side of a block fetched from the reference frame during motion compensation ("X OF BLOCK") is greater than an x-coordinate of a left side of the right boundary ("X OF BOUNDARY") (132). If frame substitution unit 52 determines that the horizontal x-coordinate of the right side of a block fetched from the reference frame during motion compensation ("X OF BLOCK") is greater than the x-coordinate of the left side of the right boundary ("X OF BOUNDARY"), frame substitution unit 52 performs false boundary correction for block MB(M−1, j) (134).

When the x-component of the motion vector associated with block MB(M−1, j) is equal to zero, the horizontal x-coordinate of the right side of a block fetched from the reference frame during motion compensation ("X OF BLOCK") is not greater than the x-coordinate of the left side of the right boundary ("X OF BOUNDARY"), or after false boundary correction, frame substitution unit 52 determines whether the variable j is equal to N, where N is the number of blocks of the first column (136). When j is not equal to N, frame substitution unit 52 increments variable j (138) and loops back to process the next block MB(M, j) in the manner described above. Frame substitution unit 52 continues to process the blocks in the last, e.g., right, column until j is equal to N, i.e., there are no more remaining blocks to process.

With reference to FIG. 6B, when j is equal to N or the boundary is determined at block (116) to not be a right boundary, frame substitution unit 52 determines whether the boundary extends along a top of the reference frame, i.e., is a top boundary (140). If frame substitution unit 52 determines the boundary in the reference frame extends along the top side of the reference frame, i.e., is a top boundary, frame substitution unit 52 sets a variable i=1 and selects block MB(i, 1) of the substituted frame (142, 144). Block MB(i, 1) is the block located at the $i^{th}$ column and the first row. Because i is initially set equal to 1, the first block selected is the block of the first column and first row of the substitute frame.

Frame substitution unit 52 determines whether a y-component of a motion vector ($MV_y$) associated with block MB(i, 1) is equal to zero (146). The motion vector associated with block MB(i, 1) may, in some instances, be computed as a function of motion vectors associated with the one or more reference frames, e.g., via interpolation or extrapolation. When frame substitution unit 52 determines that the y-component of the motion vector associated with block MB(i, 1) of the substituted frame is not equal to zero, frame substitution unit 52 determines that the y-component of the motion vector associated with block MB(i, 1) of the substituted frame is greater than zero (148). If frame substitution unit 52 determines that the y-component of the motion vector associated with block MB(i, 1) of the substituted frame is greater than zero, frame substitution unit 52 performs false boundary correction (150). False boundary correction may be performed in the pixel domain or the compressed domain as described in detail in this disclosure.

After performing false boundary correction or when the y-component of the motion vector associated with block MB(i, 1) is less than zero, frame substitution unit 52 performs actual boundary correction (152). Like false boundary correction, actual boundary correction may be performed in the pixel domain or the compressed domain as described in detail in this disclosure. In this manner, frame substitution unit 52 performs uses different boundary artifact correction techniques to correct different types of boundary artifacts. For example, boundary artifacts associated with actual boundary locations are corrected using one of the actual boundary correction techniques and boundary artifacts associated with false boundary locations are corrected using one of the false boundary correction techniques.

After actual boundary correction or when the y-component of the motion vector associated with the block is equal to zero, frame substitution unit 52 determines whether a y-component of a motion vector associated with a block MB(i, 2) is equal to zero (154). Block MB(i, 2) is the block located at the $i^{th}$ column and the second row. In other words, block MB(i, 2) is the block immediately adjacent in the vertical down direction to block MB(i, 1). When the y-component of the motion vector associated with block MB(i, 2) is not equal to zero, frame substitution unit 52 determines whether a vertical y-coordinate of a top side of a block fetched from the reference frame during motion compensation ("Y OF BLOCK") is less than a y-coordinate of a bottom side of the top boundary ("Y OF BOUNDARY") (156). If frame substitution unit 52 determines that the vertical y-coordinate of the top side of a block fetched from the reference frame during motion compensation ("Y OF BLOCK") is less than the y-coordinate of the bottom side of the top boundary ("Y OF BOUNDARY"), frame substitution unit 52 performs false boundary correction for block MB(i, 1) (158).

When the y-component of the motion vector associated with block MB(i, 2) is equal to zero, the vertical y-coordinate of the top side of a block fetched from the reference frame during motion compensation ("Y OF BLOCK") is not less than the y-coordinate of the bottom side of the top boundary ("Y OF BOUNDARY"), or after false boundary correction, frame substitution unit 52 determines whether the variable i is equal to M, where M is the number of blocks of the first row (160). When i is not equal to M, frame substitution unit 52 increments variable j (162) and processes block MB(i, 1) in the manner described above. Frame substitution unit 52 continues to process the blocks in the top row until i is equal to M, i.e., there are no more remaining blocks to process.

When i is equal to M or the boundary is determined at block (140) to not be a top boundary, frame substitution unit 52 determines whether the boundary extends along a bottom of the reference frame, i.e., is a bottom boundary (163). If frame substitution unit 52 determines the boundary in the reference frame extends along the bottom of the reference frame, i.e., is a bottom boundary, frame substitution unit 52 sets a variable i=1 and selects block MB(i, N) of the substitute frame (164, 165). Block MB(i, N) is the block located at the $i^{th}$ column and the $M^{th}$ row. Because i is initially set equal to 1, the first block selected is the block of the first column and last row of the substitute frame.

Frame substitution unit 52 determines whether an y-component of a motion vector ($MV_y$) associated with block MB(i, N) is equal to zero (166). The motion vector associated with block MB(i, N) may, in some instances, be computed as a function of motion vectors associated with the one or more reference frames, e.g., via interpolation or extrapolation. When frame substitution unit 52 determines that the y-component of the motion vector associated with block MB(i, N) of the substituted frame is not equal to zero, frame substitution unit 52 determines that the y-component of the motion vector associated with block MB(i, N) of the substituted frame is less than zero (168). If frame substitution unit 52 determines that the y-component of the motion vector associated with block MB(i, N) of the substitute frame is less than zero, frame substitution unit 52 performs false boundary correction (170). False boundary correction may be performed in the pixel domain or the compressed domain as described in detail in this disclosure.

After performing false boundary correction or when the y-component of the motion vector associated with block MB(1, N) is greater than zero, frame substitution unit 52 performs actual boundary correction (172). Like false boundary correction, actual boundary correction may be performed in the pixel domain or the compressed domain as described in detail in this disclosure. In this manner, frame substitution unit 52 uses different boundary artifact correction techniques to correct different types of boundary artifacts. For example, boundary artifacts associated with actual boundary locations may be corrected using one of the actual boundary correction techniques and boundary artifacts associated with false boundary locations are corrected using one of the false boundary correction techniques.

After actual boundary correction or when the y-component of the motion vector associated with the block is equal to zero, frame substitution unit 52 determines whether a y-component of a motion vector associated with a block MB(i, N−1) is equal to zero (174). Block MB(i, N−1) is the block located at the $i^{th}$ column and the second to last row. In other words, block MB(i, N−1) is the block immediately adjacent in the negative vertical up direction to block MB(i, N−1). When the y-component of the motion vector associated with block MB(i, N−1) is not equal to zero, frame substitution unit 52 determines whether a vertical y-coordinate of a bottom side of a block fetched from the reference frame during motion compensation ("Y OF BLOCK") is greater than a y-coordinate of a top side of the bottom boundary ("Y OF BOUNDARY") (156). If frame substitution unit 52 determines that the vertical y-coordinate of the bottom side of a block fetched from the reference frame during motion compensation ("Y OF BLOCK") is greater than the y-coordinate of the top side of the bottom boundary ("Y OF BOUNDARY"), frame substitution unit 52 performs false boundary correction for block MB(i, N) (178).

When the y-component of the motion vector associated with block MB(i, N−1) is equal to zero, the vertical y-coordinate of the bottom side of a block fetched from the reference frame during motion compensation ("Y OF BLOCK") is greater than the y-coordinate of the top side of the bottom boundary ("Y OF BOUNDARY"), or after false boundary correction, frame substitution unit 52 determines whether the variable i is equal to M, where M is the number of blocks of the first row (180). When i is not equal to M, frame substitution unit 52 increments variable i (182) and processes block MB(i, N) in the manner described above. Frame substitution unit 52 continues to process the blocks in the bottom row until i is equal to M, i.e., there are no more remaining blocks to process.

Figure 7:
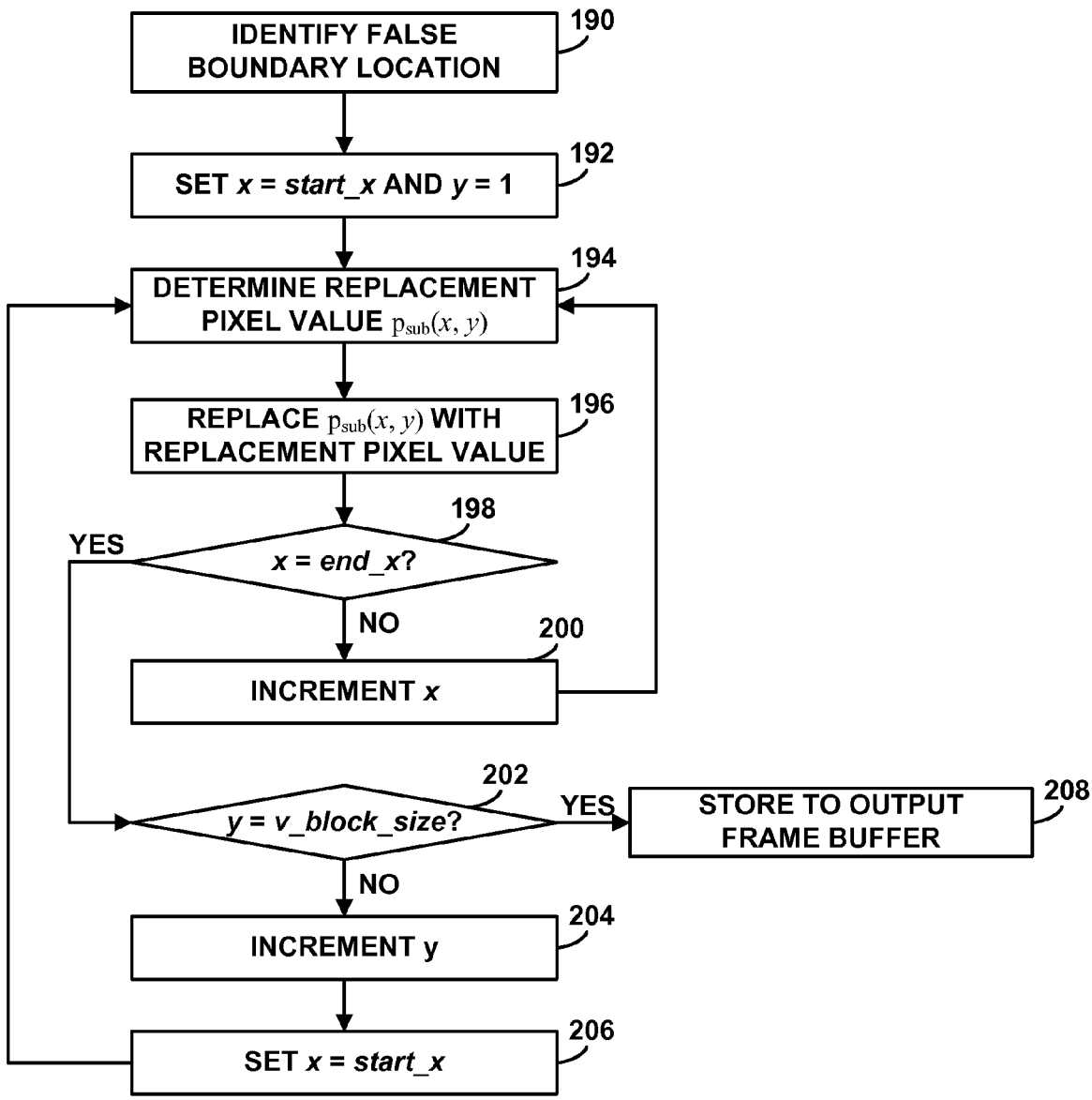
FIG. 7 is a flow diagram illustrating example operation of a frame substitution unit performing false boundary replacement in the pixel domain.

FIG. 7 is a flow diagram illustrating example operation of a frame substitution unit 52 performing false boundary replacement in the pixel domain. As described above, false boundary artifact correction is performed to correct boundary artifacts associated with false boundary locations, e.g., locations corresponding to a boundary that does not exist within the reference video frame, but is propagated into the substituted frame due to motion compensated interpolation.

Boundary artifact identification unit 68 initially identifies a false boundary location within the block of pixels of the substituted frame (190). As described in detail above, boundary artifact identification unit 68 may identify the false boundary location using a width of the boundary and a value of the motion vector associated with the block. In the case of a left boundary, for example, the false boundary location may include the columns of pixels in the block starting from start_x and ending at end_x, where start_x and end_x may be defined by equations:

$$\text{start\_}x = \text{Left\_}B\_\text{width}+1 \quad (1)$$

$$\text{end\_}x = \text{Left\_}B\_\text{width}+1+mv\_x, \quad (2)$$

where Left_B_width is the boundary width of the left boundary and mv_x is the value of the x-component of the motion vector associated with the block of pixels. As such, each of the rows of pixels in the block includes end_x−start_x+1 pixels within the false boundary location. The total number of pixels in the false boundary location is equal to (end_x−start_x+1) *v_block_size, where v_block_size is a vertical dimension of the block.

False boundary correction unit 72 replaces each of the pixel values of pixels within the false boundary location with replacement pixel values. In one aspect, false boundary correction unit 72 may replace pixel values within the false boundary location by setting an x-coordinate (x) equal to start_x and a y-coordinate (y) equal to one (192). False boundary correction unit 72 determines a replacement pixel value for pixel $p_{sub}(x, y)$ within the false boundary location (194). False boundary correction unit 72 may, for example, determine the replacement pixel value for the pixel located at position (x, y) using the following equation:

$$p_{sub}(x, y) = (p_{ref}(\text{end\_}x+1, y) + p_{ref}(\text{end\_}x+2, y))/2, \quad (3)$$

where $p_{sub}(x, y)$ is the replacement pixel value for the pixel located at position (x, y) within the substitute frame, $p_{ref}(\text{end\_}x+1, y)$ is a pixel value of the pixel located at position (end_x+1, y) in the reference frame, and $p_{ref}(\text{end\_}x+2, y)$ is a pixel value of the pixel location at position (end_x+2, y) in the reference frame. As described above, $p_{ref}(\text{end\_}x+1, y)$ and $p_{ref}(\text{end\_}x+2, y)$ are pixel values of pixels located in the same row of the reference frame as the pixel to be replaced in the substitute frame and immediately adjacent to the boundary in the reference frame. In other words, the replacement pixel value is computed as an average of the pixel values of the first pixel and second pixel, $p_{ref}(\text{end\_}x+1, y)$ and $p_{ref}(\text{end\_}x+2, y)$ respectively, following the boundary in the reference frame. False boundary correction unit 72 may determine the replacement pixel value for the pixel located at position (x, y) using other techniques, such as those represented by equations (4) and (5):

$$p_{sub}(x, y) = p_{ref}(\text{end\_}x+1, y) \quad (4)$$

$$p_{sub}(x, y) = (K1 * p_{ref}(\text{end\_}x+1, y) + K2 * p_{ref}(\text{end\_}x+2, y)), \quad (5)$$

where K1 and K2 are coefficients. In other words, equation (4) represents using the pixel value of the first pixel after the boundary for every replacement pixel and equation (5) represents using a weighted sum of pixel values for the replacement pixel values.

False boundary correction unit 72 replaces the pixel value of the selected pixel within the false boundary location with the replacement pixel value (196). False boundary correction unit 72 determines whether x is equal to end_x (198). When x is not equal to end_x, which indicates there are pixel values in the current row that need to be replaced, false boundary correction unit 72 increments x (200) and determines a replacement pixel value for the next pixel along the row.

If x is equal to end_x, which indicates that there are no remaining pixel values in the row of the false boundary location that needs to be replaced, false boundary correction unit 72 determines whether y is equal to the block size in the vertical dimension (v_block_size) (202). When y is not equal to the block size in the vertical dimension (v_block_size), which indicates there are pixel values in the at least one other column that need to be replaced, false boundary correction unit 72 increments y (204) and sets x equal to start_x (206). False boundary correction unit 72 then determines replacement pixel values for the pixels along the next row. If y is equal to v_block_size, which indicates that there are no remaining pixel values of the false boundary location that needs to be replaced, false boundary correction unit 72 stores the pixel values of the corrected substitute frame to output frame buffer (208).

Figure 8:
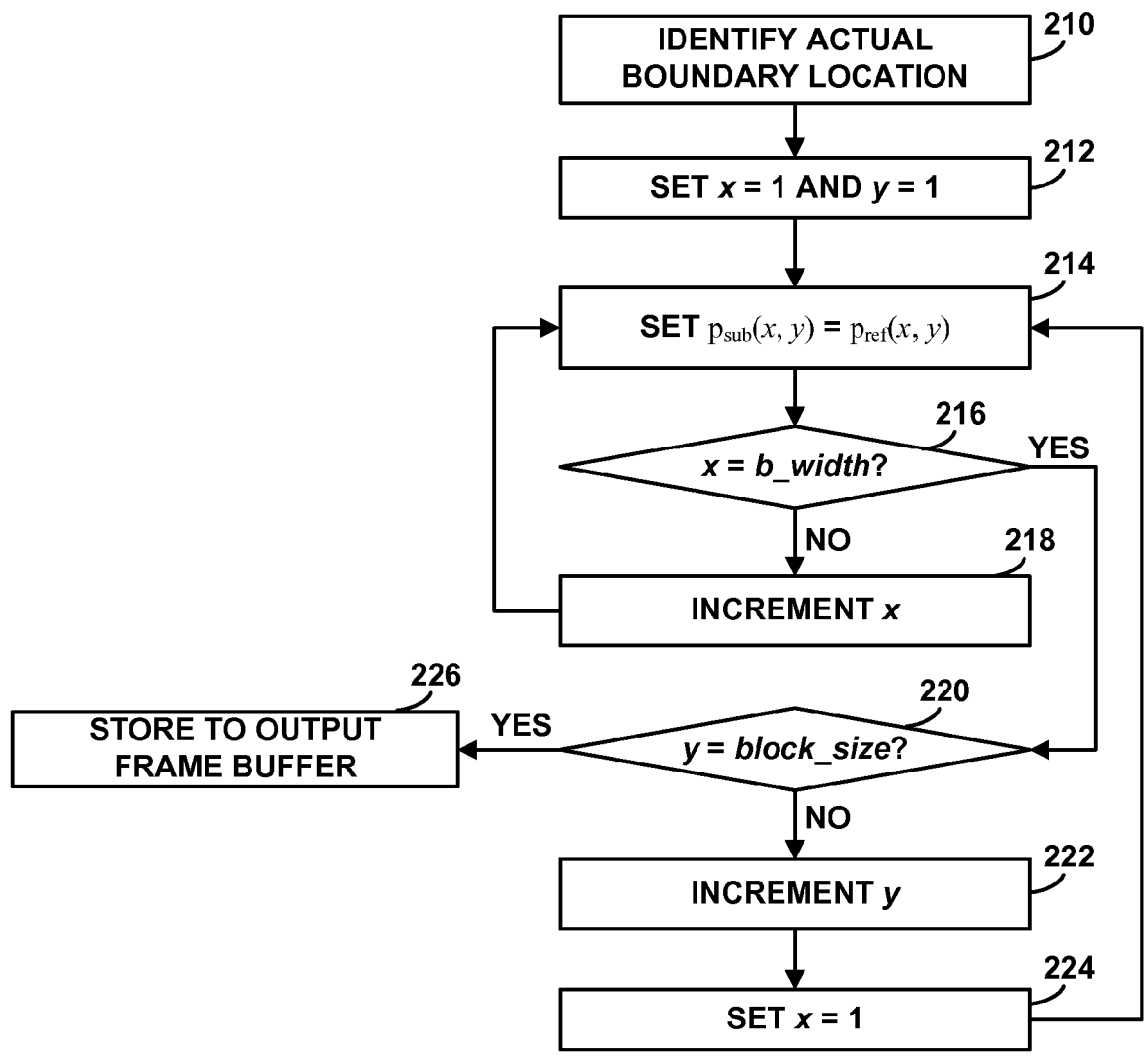
FIG. 8 is a flow diagram illustrating example operation of a frame substitution unit performing actual boundary replacement in the pixel domain.

FIG. 8 is a flow diagram illustrating example operation of a frame substitution unit 52 performing actual boundary replacement in the pixel domain. As described above, actual boundary artifact correction is performed to correct boundary artifacts associated with actual boundary locations, e.g., locations corresponding to a boundary that does exist within the reference video frame and should also exist in the substituted frame.

Boundary artifact identification unit 68 identifies an actual boundary location within the block of pixels of the substituted frame (210). Boundary artifact identification unit 68 may identify the actual boundaries using a width of a boundary in a reference frame. In the case of a left boundary within the reference frame, for example, boundary artifact correction may identify the leftmost b_width number of columns of pixels of the block in the substituted frame as the actual boundary location. Actual boundary replacement unit 70 may set a variable x=1 and a variable y=1, where x and y are positional coordinates of a pixel in the x and y-direction, respectively (212).

Actual boundary replacement unit 70 sets a pixel value of a pixel within the actual boundary location $p_{sub}(x, y)$ equal to a pixel value of a pixel at a corresponding location within the reference frame $p_{ref}(x, y)$ (214). Actual boundary correction unit 70 determines whether x is equal to the boundary width (b_width) (216). When x is not equal to the boundary width (b_width), which indicates there are pixel values in the actual boundary location that need to be replaced, actual boundary correction unit 70 increments x (218). Actual boundary correction unit 70 continues to set pixel values of the row of pixels within the actual boundary location equal to pixel values of pixels at a corresponding location within the reference frame until x is equal to the boundary width (b_width).

When x is equal to the boundary width (b_width), actual boundary correction unit 70 determines whether y is equal to a block size of the block (block_size) (220). If y is not equal to a block size of the block (block_size), which indicates that there is at least one remaining row of pixels in the actual boundary location that need to be replaced, actual boundary correction unit 70 increments y (222) and sets x equal one (224). Actual boundary correction unit 70 then determines replacement pixel values for the pixels along the next row. If y is equal to block_size, which indicates that there are no remaining pixel values in the actual boundary location that need to be replaced, actual boundary correction unit 70 stores the pixel values in the output frame buffer (226).

Figure 9:
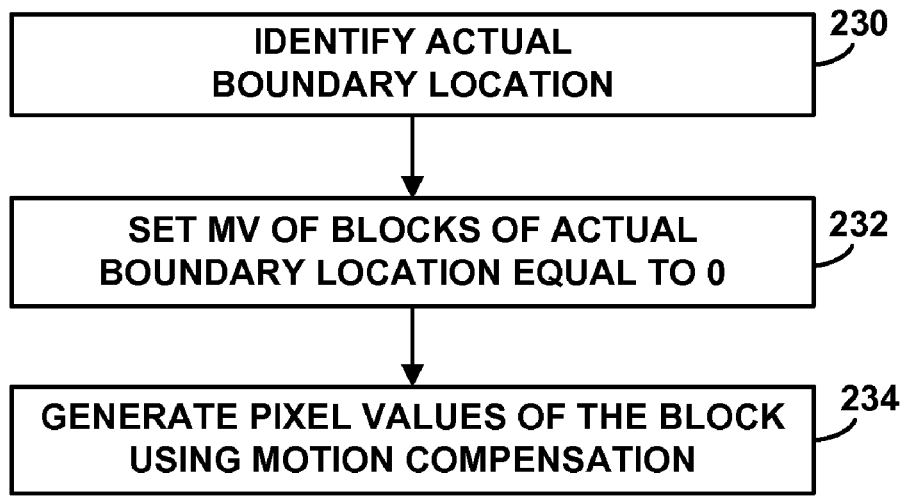
FIG. 9 is a flow diagram illustrating example operation of a frame substitution unit performing actual boundary replacement in the compressed domain.

FIG. 9 is a flow diagram illustrating example operation of a frame substitution unit 52 performing actual boundary replacement in the compressed domain. Boundary artifact identification unit 68 initially identifies an actual boundary location within the substitute frame (230). In the compressed domain, the actual boundary location may be a block that is identified to include at least one pixel that corresponds to a boundary that exists within the reference frame. For example, assuming there is a boundary along a left side of the frame containing a plurality of 4×4 blocks and the boundary has a width of seven pixels, boundary artifact detection module 18 identifies each of the blocks of the first two columns of 4×4 blocks as actual boundary locations. Unlike the pixel domain where only a portion of the pixels of the block were determined to be in the actual boundary locations, the entire block is considered to be the actual boundary location, even if some of the pixels of the block do not actually correspond to the boundary of the reference frame. In the example above, even though the second column of 4×4 blocks only includes three columns of pixels that correspond to the boundary that exists in the reference frame, the entire block is determined to be the actual boundary location.

Actual boundary correction unit 70 sets a motion vector associated with the block of the actual boundary artifact equal to zero (232). Frame substitution unit 52 generates the block identified as the actual boundary location using the motion vector associated with the block (234). Because the motion vector associated with the block was set to zero during artifact correction, the block is a copy of the corresponding block of the reference frame.

Figure 10:
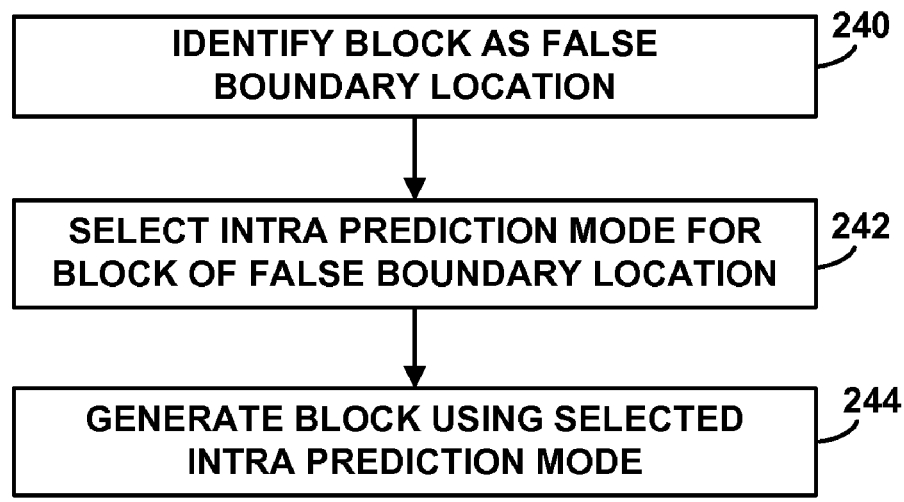
FIG. 10 is a flow diagram illustrating example operation of a frame substitution unit performing false boundary replacement in the compressed domain.

FIG. 10 is a flow diagram illustrating example operation of a frame substitution unit 52 performing false boundary replacement in the compressed domain. Boundary artifact identification unit 68 initially identifies a false boundary location (240). In the compressed domain, the false boundary location may be a block that is identified to include at least one pixel that corresponds to a boundary that exists within the substituted frame, e.g., due to motion compensated interpolation, but does not exist in the reference frame. A block that includes at least some pixels that correspond to an actual boundary in the reference frame is not classified as a false boundary location, even if the frame includes false boundary artifacts. This is because the false boundary artifacts in the block will be corrected during the actual boundary artifact correction, e.g., by setting the motion vector of the block equal to zero.

Actual boundary correction unit 70 selects an intra prediction mode for the block identified as the false boundary location (242). Frame substitution unit 52 performs intra prediction using the selected intra prediction mode to generate the block identified as the false boundary location (244). The intra prediction mode selected for the block identified as the false boundary location may depend on the location of the boundary, e.g., whether the boundary is along the top, bottom, left side or right side of the frame. Since intra prediction in H.264 requires causal pixels (e.g., pixels of neighboring blocks) to be present for prediction, different boundary locations may be corrected using different intra prediction modes.

For example, intra prediction may be used for boundaries located along a bottom (i.e., south) or right side of the frame since causal neighbors exist for those 4×4 blocks. However, for boundaries location along a top (i.e., north) and left side of the frame, 4×4 blocks causal neighbors are black boundaries and predicting from black boundary will propagate the black areas into the 4×4 blocks. If the false boundary location is along a bottom or top of the frame, intra 4×4 vertical mode may be selected for correction. If the false boundary location is along a left or right side of the frame, intra 4×4 horizontal mode may be selected for correction. Other modes may, however be selected for correction.

Figure 11A:
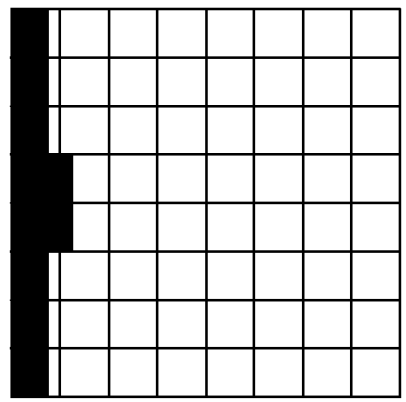
FIGS. 11A-11C are diagrams illustrating a substitute frame after various stages of correction in the compressed domain.
Figure 11B:
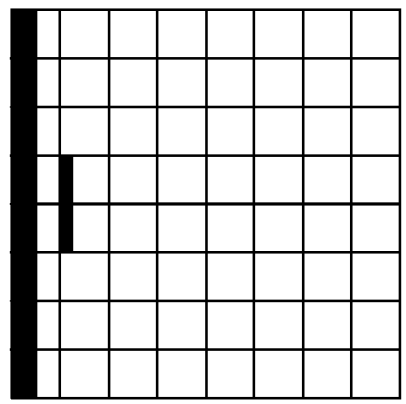
Figure 11C:
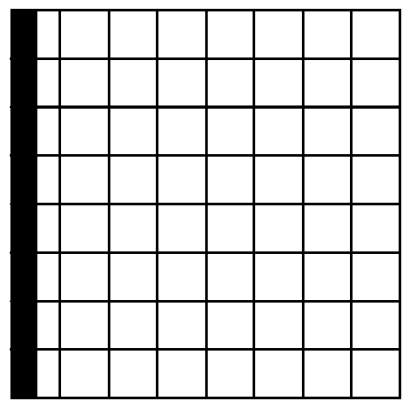

FIGS. 11A-11C are diagrams illustrating a substitute frame after various stages of correction in the compressed domain. FIG. 11A illustrates the substitute frame that includes boundary artifacts generated during frame substitution, e.g., during motion compensation. As illustrated in FIG. 11A, two blocks of the substitute frame include a boundary that extends further within the frame than at other locations.

FIG. 11B illustrates the substitute frame after performing actual boundary correction in the compressed domain. As described above, actual boundary correction unit 70 may correct actual boundary locations by setting a motion vector associated with the blocks identified as actual boundary locations equal to zero. During actual boundary correction in the compressed domain, the first column of blocks in the substitute frame are copied from the reference frame, resulting in the boundary along the first column of blocks in the substitute frame being the same as the first column of blocks in the reference frame. However, as illustrated in FIG. 11B, there still remains false boundary artifacts within the blocks of column two, rows four and five.

To correct these false boundary artifacts, false boundary correction unit 72 selects an intra prediction mode for the blocks. After applying the intra prediction mode selected for the blocks the false boundary artifacts are removed to obtain the substitute frame illustrated in FIG. 11C, which has a substantially similar boundary to that of the reference frame from which the substitute frame was generated.

The techniques described herein may be implemented in hardware, software, firmware, or any combination thereof Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset. Such integrated circuit devices may be used in a variety of applications, some of which may include use in wireless communication devices, such as mobile telephone handsets.

Various aspects of the disclosed techniques have been described. These and other aspects are within the scope of the following claims.

The invention claimed is:

1. A method for decoding by a decoder comprising:
analyzing a substitute video unit to identify locations of the substitute video unit that include boundary artifacts; and correcting the boundary artifacts in the identified locations of the substitute video unit,
wherein analyzing said substitute video unit to identify locations of the substitute video unit that include boundary artifacts comprises:
identifying first locations within the substitute video unit that include first boundary artifacts that correspond with a boundary which exists within a reference video unit does not exist in the substitute video unit;
identifying second locations within the substitute video unit that include second boundary artifacts that correspond with a boundary which exists within the substitute video unit does not exist within the reference video unit;
wherein correcting the boundary artifacts in the identified locations further comprises: correcting boundary artifacts in the first locations of the substitute video unit using a first boundary artifact correction technique; and correcting boundary artifacts in the second locations of the substitute video unit using a second boundary artifact correction technique.

2. The method for decoding by a decoder of claim 1, wherein correcting boundary artifacts in the first and second locations comprises correcting boundary artifacts in the first and second locations in the pixel domain.

3. The method for decoding by a decoder of claim 1, wherein correcting boundary artifacts in the first locations comprises replacing pixel values of pixels within the first locations of the substitute video unit with pixel values that are similar to the pixel values of the boundary that exists within the reference video unit, and wherein correcting boundary artifacts in the second locations comprises replacing pixel values of pixels within the second locations with pixel values computed as an average of one or more pixel values adjacent to the boundary that exists in the reference video unit.

4. The method for decoding by a decoder of claim 3, wherein replacing pixel values of pixels within the first locations of the substitute video unit comprises one of replacing the pixel values of pixels within the first locations of the substitute video unit with a copy of pixel values within a corresponding location in the reference video unit or replacing the pixel values of pixels within the first location of the substituted video unit with pre-determined boundary pixel values.

5. The method for decoding by a decoder of claim 1, wherein correcting boundary artifacts in the first and second locations comprises correcting boundary artifacts in the first and second locations before interpolating or extrapolating the pixel values of the substitute video unit.

6. The method for decoding by a decoder of claim 5, wherein correcting boundary artifacts in the first locations comprises: setting motion vectors associated with respective blocks of the first locations equal to zero, and performing inter prediction for the blocks of the first locations using the motion vectors associated with the respective blocks, and wherein correcting boundary artifacts in the second locations comprises: selecting an intra prediction mode for blocks of the second locations of the substitute frame, and performing intra prediction using the selected intra prediction mode.

7. The method for decoding by a decoder of claim 1, wherein identifying the first locations within the substitute video unit comprises: identifying W columns of pixels of the substitute frame as the first locations when the boundary that exists within the reference video unit is along a left side or a right side of the reference video unit; and identifying W rows of pixels of the substitute frame as the first locations when the boundary that exists within the reference video unit is along a top or bottom of the reference video unit, wherein W is a width of the boundary that exists within the reference video unit.

8. The method for decoding by a decoder of claim 7, wherein identifying the second locations within the substitute video unit comprises: identifying $MV_x$ columns of pixels of the substitute frame adjacent to the W columns of pixels as the second locations when $MV_x$ is not equal to zero, wherein $MV_x$ is an x-component of the motion vectors of the respective blocks; and identifying $MV_y$ rows of pixels of the substitute frame adjacent to the W rows of pixels as the second locations when $MV_y$ is not equal to zero, wherein $MV_y$ is a y-component of the motion vectors of the respective blocks.

9. The method for decoding by a decoder of claim 1, wherein identifying the first locations within the substitute video unit comprises: computing L=ceiling (W, N), where the ceiling function outputs a next largest integer of W/N, where W is a width of the boundary in the reference frame and N is a block size along an x-direction; identifying L columns of blocks of the substitute frame as the first locations when the boundary that exists within the reference video unit is along a left side or a right side of the reference video unit; and computing K=ceiling (W, M), where the ceiling function outputs a next largest integer of W/M, where W is the width of the boundary in the reference frame and M is a block size along an y-direction, identifying K rows of pixels of the substitute frame as the first locations when the boundary that exists within the reference video unit is along a top or bottom of the reference video unit.

10. The method for decoding by a decoder of claim 9, wherein identifying the first locations in the substitute video unit further comprises: identifying a column of blocks adjacent to the L columns of blocks as first boundary locations when W is a multiple of N; and identifying a row of blocks adjacent to the K rows of blocks as first boundary locations when W is a multiple of M.

11. The method for decoding by a decoder of claim 9, wherein identifying the second locations within the substitute video unit comprises: identifying at least a portion of a column of blocks adjacent to the L columns of blocks as second boundary locations based on an x-coordinate of the block and an x-coordinate of the boundary location; and identifying at least a portion of a row of blocks adjacent to the K rows of blocks as second boundary locations based on a y-coordinate of the block and a y-coordinate of the boundary location.

12. The method for decoding by a decoder of claim 1, wherein the first locations comprise actual boundary locations, and wherein the second locations comprise false boundary locations.

13. The method for decoding by a decoder of claim 1, wherein analyzing a substitute video unit to identify locations of the substitute video unit that include boundary artifacts comprises not identifying locations of the substitute video unit that include pixels in the boundary and no boundary artifacts.

14. The method for decoding by a decoder of claim 1, further comprising generating the substitute video unit using one of motion-compensated interpolation and motion-compensated extrapolation.

15. The method for decoding by a decoder of claim 1, wherein the substitute video unit comprises one of a substitute video frame, a substituted video slice, or a substitute video block.

16. An apparatus comprising: a boundary artifact identification unit that analyzes a substitute video unit to identify locations of the substitute video unit that include boundary artifacts; and a boundary artifact correction unit that corrects the boundary artifacts in the identified locations of the substitute video unit,
   wherein the boundary artifact identification unit identifies first locations within the substitute video unit that include first boundary artifacts that correspond with a boundary which exists within a reference video unit does not exist in the substitute video unit;
   identifies second locations within the substitute video unit include second boundary artifacts that correspond with a boundary which exists within the substitute video unit does not exist within the reference video unit;
   wherein the boundary artifact correction unit corrects boundary artifacts in the first locations of the substitute video unit using a first boundary artifact correction technique and corrects boundary artifacts in the second locations of the substitute video unit using a second boundary artifact correction technique.

17. The apparatus of claim 16, wherein the boundary artifact correction unit corrects boundary artifacts in the first and second locations in the pixel domain.

18. The apparatus of claim 16, wherein the boundary artifact correction unit: replaces pixel values of pixels within the first locations of the substitute video unit with pixel values that are similar to the pixel values of the boundary that exists within the reference video unit, and replaces pixel values of pixels within the second locations with pixel values computed as an average of one or more pixel values adjacent to the boundary that exists in the reference video unit.

19. The apparatus of claim 18, wherein the boundary artifact correction unit replaces pixel values of pixels within the first locations of the substitute video unit by replacing the pixel values of pixels within the first locations of the substitute video unit with a copy of pixel values within a corresponding location in the reference video unit or replacing the pixel values of pixels within the first location of the substituted video unit with pre-determined boundary pixel values.

20. The apparatus of claim 16, wherein the boundary artifact correction unit corrects boundary artifacts in the first and second locations before interpolating or extrapolating the pixel values of the substitute video unit.

21. The apparatus of claim 20, wherein the boundary artifact correction unit:
   sets motion vectors associated with respective blocks of the first locations equal to zero, and
   performs inter prediction for the blocks of the first locations using the motion vectors associated with the respective blocks, and
   selects an intra prediction mode for blocks of the second locations of the substitute frame, and
   performs intra prediction using the selected intra prediction mode.

22. The apparatus of claim 16, wherein the boundary artifact identification unit: identifies W columns of pixels of the substitute frame as the first locations when the boundary that exists within the reference video unit is along a left side or a right side of the reference video unit; and identifies W rows of pixels of the substitute frame as the first locations when the boundary that exists within the reference video unit is along a top or bottom of the reference video unit, wherein W is a width of the boundary that exists within the reference video unit.

23. The apparatus of claim 22, wherein the boundary artifact identification unit:
   identifies $MV_x$ columns of pixels of the substitute frame adjacent to the W columns of pixels as the second locations when $MV_x$ is not equal to zero, wherein $MV_x$ is an x-component of the motion vectors of the respective blocks; and
   identifies $MV_y$ rows of pixels of the substitute frame adjacent to the W rows of pixels as the second locations when $MV_y$ is not equal to zero, wherein $MV_y$ is a y-component of the motion vectors of the respective blocks.

24. The apparatus of claim 16, wherein the boundary artifact identification unit: computes L=ceiling (W, N), where the ceiling function outputs a next largest integer of W/N, where W is a width of the boundary in the reference frame and N is a block size along an x-direction; identifies L columns of blocks of the substitute frame as the first locations when the boundary that exists within the reference video unit is along a left side or a right side of the reference video unit; and computes K=ceiling (W, M), where the ceiling function outputs a next largest integer of W/M, where W is the width of the boundary in the reference frame and M is a block size along an y-direction, identifies K rows of pixels of the substitute frame as the first locations when the boundary that exists within the reference video unit is along a top or bottom of the reference video unit.

25. The apparatus of claim 24, wherein the boundary artifact identification unit:
   identifies a column of blocks adjacent to the L columns of blocks as first boundary locations when W is a multiple of N; and
   identifies a row of blocks adjacent to the K rows of blocks as first boundary locations when W is a multiple of M.

26. The apparatus of claim 24, wherein the boundary artifact identification unit:
   identifies at least a portion of a column of blocks adjacent to the L columns of blocks as second boundary locations based on an x-coordinate of the block and an x-coordinate of the boundary location; and
   identifies at least a portion of a row of blocks adjacent to the K rows of blocks as second boundary locations based on a y-coordinate of the block and a y-coordinate of the boundary location.

27. The apparatus of claim 16, wherein the first locations comprise actual boundary locations, and wherein the second locations comprise false boundary locations.

28. The apparatus of claim 16, wherein the boundary artifact identification unit does not identify locations of the substitute video unit that include pixels in the boundary and no boundary artifacts.

29. The apparatus of claim 16, further comprising generating the substitute video unit using one of motion-compensated interpolation and motion-compensated extrapolation.

30. The apparatus of claim 16, wherein the substitute video unit comprises one of a substitute video frame, a substituted video slice, or a substitute video block.

31. The apparatus of claim 16, wherein the apparatus comprises a wireless communication device.

32. The apparatus of claim 16, wherein the apparatus comprises an integrated circuit.

33. A non-transitory computer-readable medium embedded with instructions which when executed by a processor cause at least said processor to:
analyze a substitute video unit to identify locations of the substitute video unit that include boundary artifacts; and correct the boundary artifacts in the identified locations of the substitute video unit,
wherein said instructions to analyze a substitute video unit further comprise instructions to:
identify first locations within the substitute video unit that include first boundary artifacts that correspond with a boundary which exists within a reference video unit does not exist in the substitute video unit;
identify second locations within the substitute video unit that include second boundary artifacts that correspond with a boundary which exists within the substitute video unit does not exist within the reference video unit;
wherein said instructions to correct the boundary artifacts in the identified locations further comprise instructions to: correct boundary artifacts in the first locations of the substitute video unit using a first boundary artifact correction technique; and correct boundary artifacts in the second locations of the substitute video unit using a second boundary artifact correction technique.

34. The non-transitory computer-readable medium of claim 33, wherein instructions that cause the processor to correct boundary artifacts in the first locations comprises instructions that cause the processor to replace pixel values of pixels within the first locations of the substitute video unit with pixel values that are similar to the pixel values of the boundary that exists within the reference video unit, and wherein instructions that cause the processor to correct boundary artifacts in the second locations comprises instructions that cause the processor to replace pixel values of pixels within the second locations with pixel values computed as an average of one or more pixel values adjacent to the boundary that exists in the reference video unit.

35. The non-transitory computer-readable medium of claim 34, wherein instructions that cause the processor to correcting boundary artifacts in the first locations comprise instructions that cause the processor to: set motion vectors associated with respective blocks of the first locations equal to zero, and perform inter prediction for the blocks of the first locations using the motion vectors associated with the respective blocks, and wherein correcting boundary artifacts in the second locations comprises: select an intra prediction mode for blocks of the second locations of the substitute frame, and perform intra prediction using the selected intra prediction mode.

36. The non-transitory computer-readable medium of claim 33, wherein instructions that cause the processor to identify the first locations within the substitute video unit comprise instructions that cause the processor to: identify W columns of pixels of the substitute frame as the first locations when the boundary that exists within the reference video unit is along a left side or a right side of the reference video unit; and identify W rows of pixels of the substitute frame as the first locations when the boundary that exists within the reference video unit is along a top or bottom of the reference video unit, wherein W is a width of the boundary that exists within the reference video unit.

37. The non-transitory computer-readable medium of claim 33, wherein instructions that cause the processor to identify the second locations within the substitute video unit comprise instructions that cause the processor to: identify $MV_x$ columns of pixels of the substitute frame adjacent to the W columns of pixels as the second locations when $MV_x$ is not equal to zero, wherein $MV_x$ is an x-component of the motion vectors of the respective blocks; and identify $MV_y$ rows of pixels of the substitute frame adjacent to the W rows of pixels as the second locations when $MV_y$ is not equal to zero, wherein $MV_y$ is a y-component of the motion vectors of the respective blocks.

38. The non-transitory computer-readable medium of claim 33, wherein instructions that cause the processor to identify the first locations within the substitute video unit comprise instructions that cause the processor to: compute L=ceiling (W, N), where the ceiling function outputs a next largest integer of W/N, where W is a width of the boundary in the reference frame and N is a block size along an x-direction; identify L columns of blocks of the substitute frame as the first locations when the boundary that exists within the reference video unit is along a left side or a right side of the reference video unit; and compute K=ceiling (W, M), where the ceiling function outputs a next largest integer of W/M, where W is the width of the boundary in the reference frame and M is a block size along an y-direction, identify K rows of pixels of the substitute frame as the first locations when the boundary that exists within the reference video unit is along a top or bottom of the reference video unit.

39. The non-transitory computer-readable medium of claim 38, wherein instructions that cause the processor to identify the first locations in the substitute video unit further comprise instructions that cause the processor to: identify a column of blocks adjacent to the L columns of blocks as first boundary locations when W is a multiple of N; and identify a row of blocks adjacent to the K rows of blocks as first boundary locations when W is a multiple of M.

40. The non-transitory computer-readable medium of claim 39, wherein instructions that cause the processor to identify the second locations within the substitute video unit comprise instructions that cause the processor to: identify at least a portion of a column of blocks adjacent to the L columns of blocks as second boundary locations based on an x-coordinate of the block and an x-coordinate of the boundary location; and identify at least a portion of a row of blocks adjacent to the K rows of blocks as second boundary locations based on a y-coordinate of the block and a y-coordinate of the boundary location.

41. A device comprising: means for analyzing a substitute video unit to identify locations of the substitute video unit that include boundary artifacts; and means for correcting the boundary artifacts in the identified locations of the substitute video unit, wherein said means for analyzing a substitute video unit to identify first locations within the substitute video unit that include first boundary artifacts that correspond with a boundary which exists within a reference video unit does not exist in the substitute video unit, and identify second locations within the substitute video unit that include second boundary artifacts that correspond with a boundary which exists within the substitute video unit does not exist within the reference video unit;
wherein said means for correcting the boundary artifacts in the identified locations of the substitute video unit to correct boundary artifacts in the first locations of the substitute video unit using a first boundary artifact correction technique and correct boundary artifacts in the second locations of the substitute video unit using a second boundary artifact correction technique.

42. The device of claim 41, wherein the correcting means: replace pixel values of pixels within the first locations of the substitute video unit with pixel values that are substantially similar to the pixel values of the boundary that exists within the reference video unit, and replace pixel values of pixels within the second locations with pixel values computed as an average of one or more pixel values adjacent to the boundary that exists in the reference video unit.

43. The device of claim 41, wherein the correcting means: set motion vectors associated with respective blocks of the first locations equal to zero, and perform inter prediction for the blocks of the first locations using the motion vectors associated with the respective blocks, and select an intra prediction mode for blocks of the second locations of the substitute frame, and perform intra prediction using the selected intra prediction mode.

44. The device of claim 41, wherein the analyzing means: identify W columns of pixels of the substitute frame as the first locations when the boundary that exists within the reference video unit is along a left side or a right side of the reference video unit; and identify W rows of pixels of the substitute frame as the first locations when the boundary that exists within the reference video unit is along a top or bottom of the reference video unit, wherein W is a width of the boundary that exists within the reference video unit.

45. The device of claim 44, wherein the analyzing means:
identify $MV_x$ columns of pixels of the substitute frame adjacent to the W columns of pixels as the second locations when $MV_x$ is not equal to zero, wherein $MV_x$ is an x-component of the motion vectors of the respective blocks; and identify $MV_y$ rows of pixels of the substitute frame adjacent to the W rows of pixels as the second locations when $MV_y$ is not equal to zero, wherein $MV_y$ is a y-component of the motion vectors of the respective blocks.

46. The device of claim 41, wherein the analyzing means: compute L=ceiling (W, N), where the ceiling function outputs a next largest integer of W/N, where W is a width of the boundary in the reference frame and N is a block size along an x-direction; identify L columns of blocks of the substitute frame as the first locations when the boundary that exists within the reference video unit is along a left side or a right side of the reference video unit; and compute K=ceiling (W, M), where the ceiling function outputs a next largest integer of W/M, where W is the width of the boundary in the reference frame and M is a block size along an y-direction, identify K rows of pixels of the substitute frame as the first locations when the boundary that exists within the reference video unit is along a top or bottom of the reference video unit.

47. The device of claim 46, wherein the identifying means:
identify a column of blocks adjacent to the L columns of blocks as first boundary locations when W is a multiple of N; and
identify a row of blocks adjacent to the K rows of blocks as first boundary locations when W is a multiple of M.

48. The device of claim 46, wherein the identifying means:
identify at least a portion of a column of blocks adjacent to the L columns of blocks as second boundary locations based on an x-coordinate of the block and an x-coordinate of the boundary location; and
identify at least a portion of a row of blocks adjacent to the K rows of blocks as second boundary locations based on a y-coordinate of the block and a y-coordinate of the boundary location.

* * * * *